US010230803B2

United States Patent
Higgins et al.

(10) Patent No.: US 10,230,803 B2
(45) Date of Patent: Mar. 12, 2019

(54) SYSTEM AND METHOD FOR IMPROVED MAPPING AND ROUTING

(75) Inventors: Christopher William Higgins, Portland, OR (US); Marc Eliot Davis, San Francisco, CA (US); Ronald Martinez, San Francisco, CA (US); Joseph James O'Sullivan, Sunnyvale, CA (US); Athellina Athsani, San Jose, CA (US); Chris Kalaboukis, Los Gatos, CA (US); Christopher T. Paretti, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1661 days.

(21) Appl. No.: 12/182,969

(22) Filed: Jul. 30, 2008

(65) Prior Publication Data

US 2010/0027527 A1 Feb. 4, 2010

(51) Int. Cl.
*G01C 21/34* (2006.01)
*G01C 21/36* (2006.01)
(Continued)

(52) U.S. Cl.
CPC .......... *H04L 67/20* (2013.01); *G01C 21/3484* (2013.01); *G01C 21/3682* (2013.01);
(Continued)

(58) Field of Classification Search
CPC .......... G06F 17/30241; G06Q 30/0261; G01C 21/34; G01C 21/30
See application file for complete search history.

(56) References Cited

U.S. PATENT DOCUMENTS

| 5,446,891 A | 8/1995 | Kaplan et al. |
| 5,493,692 A | 2/1996 | Theimer et al. |

(Continued)

FOREIGN PATENT DOCUMENTS

| EP | 1362302 | 11/2003 |
| JP | 2002312559 | 10/2002 |

(Continued)

OTHER PUBLICATIONS

International Search Report for (PCT/US2009/051247) dated Jan. 25, 2010.
(Continued)

*Primary Examiner* — Asad M Nawaz
*Assistant Examiner* — Jason A Harley
(74) *Attorney, Agent, or Firm* — James J. DeCarlo; Greenberg Traurig, LLP

(57) ABSTRACT

A system and method for improved mapping and routing. A request for the determination of a route is received over a network. The request comprises an identification of a requesting user, and at least one objective. Spatial, temporal, topical, and social data available to the network which relating to the requesting user and the request objectives are retrieved using a global index of data available to the network. At least one entity which satisfies at least one request objective and which has a physical location known to the network is selected using the retrieved spatial, temporal, topical, and social data. At least one physical route is mapped between a starting location and the selected entity and is displayed on a display medium. Sponsored and recommended content available to the network which relates to the requesting user, and at least one objective can additionally be displayed on the display medium.

24 Claims, 20 Drawing Sheets

(51) Int. Cl.
*G08G 1/0969* (2006.01)
*H04L 29/08* (2006.01)
*G06Q 30/02* (2012.01)
*H04W 4/02* (2018.01)
*H04W 4/18* (2009.01)
*H04W 4/029* (2018.01)

(52) U.S. Cl.
CPC ............ *G06Q 30/02* (2013.01); *H04L 67/18* (2013.01); *H04L 67/306* (2013.01); *H04W 4/02* (2013.01); *H04W 4/18* (2013.01); *H04W 4/029* (2018.02)

(56) References Cited

U.S. PATENT DOCUMENTS

| | | |
|---|---|---|
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,809,242 A * | 9/1998 | Shaw .................. G06Q 10/107 709/217 |
| 5,835,087 A | 11/1998 | Herz |
| 5,903,848 A | 5/1999 | Takahashi |
| 5,920,854 A | 7/1999 | Kirsch et al. |
| 5,948,040 A * | 9/1999 | DeLorme ............... G01C 21/36 340/990 |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,014,638 A | 11/2000 | Burge et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Maker et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,973,042 B1 * | 12/2005 | Fitzgerald ............... H04L 43/50 370/249 |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Mor Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052785 A1 | 5/2002 | Smith et al. |
| 2002/0052786 A1 | 5/2002 | Kim et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |

(56) References Cited

U.S. PATENT DOCUMENTS

| | | |
|---|---|---|
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker et al. |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0073641 A1 | 10/2007 | Perry et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0257792 A1* | 11/2007 | Gold .................... 340/539.2 |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |

(56) References Cited

U.S. PATENT DOCUMENTS

| | | | |
|---|---|---|---|
| 2007/0276940 A1 | 11/2007 | Abraham et al. | |
| 2007/0282621 A1 | 12/2007 | Altman et al. | |
| 2007/0282675 A1 | 12/2007 | Varghese | |
| 2007/0288278 A1 | 12/2007 | Alexander et al. | |
| 2008/0005313 A1 | 1/2008 | Flake et al. | |
| 2008/0005651 A1 | 1/2008 | Grefenstette et al. | |
| 2008/0010206 A1 | 1/2008 | Coleman | |
| 2008/0021957 A1 | 1/2008 | Medved et al. | |
| 2008/0026804 A1 | 1/2008 | Baray et al. | |
| 2008/0028031 A1 | 1/2008 | Bailey et al. | |
| 2008/0040283 A1 | 2/2008 | Morris | |
| 2008/0046298 A1 | 2/2008 | Ben-Yehuda et al. | |
| 2008/0070588 A1 | 3/2008 | Morin | |
| 2008/0086356 A1 | 4/2008 | Glassman et al. | |
| 2008/0086431 A1 | 4/2008 | Robinson et al. | |
| 2008/0091796 A1 | 4/2008 | Story et al. | |
| 2008/0096664 A1 | 4/2008 | Baray et al. | |
| 2008/0102911 A1 | 5/2008 | Campbell et al. | |
| 2008/0104061 A1 | 5/2008 | Rezaei | |
| 2008/0104227 A1 | 5/2008 | Birnie et al. | |
| 2008/0109761 A1 | 5/2008 | Stambaugh | |
| 2008/0109843 A1 | 5/2008 | Ullah | |
| 2008/0114751 A1 | 5/2008 | Cramer et al. | |
| 2008/0120183 A1 | 5/2008 | Park | |
| 2008/0120308 A1 | 5/2008 | Martinez et al. | |
| 2008/0120690 A1 | 5/2008 | Norlander et al. | |
| 2008/0133750 A1 | 6/2008 | Grabarnik et al. | |
| 2008/0147655 A1 | 6/2008 | Sinha et al. | |
| 2008/0147743 A1 | 6/2008 | Taylor et al. | |
| 2008/0148175 A1 | 6/2008 | Naaman et al. | |
| 2008/0154720 A1 | 6/2008 | Gounares | |
| 2008/0163284 A1 | 7/2008 | Martinez et al. | |
| 2008/0172632 A1 | 7/2008 | Stambaugh | |
| 2008/0177706 A1 | 7/2008 | Yuen | |
| 2008/0270579 A1 | 10/2008 | Herz et al. | |
| 2008/0285886 A1 | 11/2008 | Allen | |
| 2008/0301250 A1 | 12/2008 | Hardy et al. | |
| 2008/0320001 A1 | 12/2008 | Gaddam | |
| 2009/0005987 A1 | 1/2009 | Vengroff et al. | |
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1* | 5/2010 | Smith et al. | 345/418 |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

Almieda, R.B. et al. "A Community-Aware Search Engine," WWW2004, New York., NY, May 17-22, 2004, pp. 413-421.

Anonymous. (Jul. 16, 2006). MyFantasyLeague Fantasy Football League Management—Features, located at <http://web.archive.org/web/20060716072900/www.myfantasyleague.com/features.htm>, last visited on Feb. 10, 2009, four pages.

Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.

Bharat, K. (Date Unknown). "SearchPad: Explicit Capture of Search Context to Support Web Search," located at <http://www9.org/w9cdrom/173/173.html >, last visited Aug. 1, 2007, 13 pages.

Budzik, J. et al. (2000). "User Interactions with Everyday Applications as Context for Just-in-Time Information Access," Proceeding of the 2000 Conference on Intelligent User Interfaces, eight pages.

Finkelstein, L. et al. (2001). "Placing Search in Context: The Concept Revisited," WWW/0, Hong Kong, May 2-5, 2001, pp. 406-414.

Freyne, J. et al. (2004). "Further Experiments on Collaborative Ranking in Community-Based Web Search," Artificial Intelligence Review, pp. 1-23.

Lieberman, H. (1995) "Letizia: An Agent that Assists Web Browsing," Proceedings of the Fourteenth International Joint Conference on Artificial Intelligence, Aug. 20-25, 1995, six pages.

Mitra, M. et al. (1998). "Improving Automatic Query Expansion," Proceedings of the AMC SIGIR, nine pages.

Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent. . . >, last visited Aug. 1, 2007, six pages.

Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.

Yahoo! Inc. (Dec. 7, 2005). "Yahoo! Widget Engine 3.0 Reference Manual Version 3.0," 300 pages.

U.S. Appl. No. 12/407,690, filed Mar. 19, 2009; 50 pages.

U.S. Appl. No. 12/407,681, filed Mar. 19, 2009; 56 pages.

(56) References Cited

OTHER PUBLICATIONS

International Search Report PCT/US2008/088228 dated Sep. 30, 2009—2 pages.
Written Opinion PCT/US2008/088228 dated Sep. 30, 2009—5 pages.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"DAVE.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, Proximity Based Group Communications for Mobile AD HOC Networks'; Proximity-Based Group Communication; Global Smart Spaces; D.14; Oct. 3, 2003; 31 pages.
Brunato, M; Battiti R. "PILGRIM: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).

International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "Stalk. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.

(56) References Cited

OTHER PUBLICATIONS

Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org," located at <http://wikimpaia.org/>, last visited on Mar. 3, 2008, one page.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Notification of Transmittal of The International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode—URL Barcodes—practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu .acil/Personal_sites/tarnirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and Odbase R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
0' Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM'03'Berkeley: California. 12 pages.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.

(56) References Cited

OTHER PUBLICATIONS

Office Action U.S. Appl. No. 12/041,088 dated Oct. 4, 2010; 18 pages.
U.S. Appl. No. 12,273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.

* cited by examiner

SYSTEM AND METHOD FOR IMPROVED MAPPING AND ROUTING

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for mapping and routing on a network and, more particularly, to systems and methods for mapping and routing which generate maps and routes based on user preferences and objectives.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is directed to a method. A request for the determination of a route is received over a network. The request comprises an identification of a requesting user, and at least one objective. Spatial, temporal, topical, and social data available to the network which relating to the requesting user and the request objectives are retrieved using a global index of data available to the network. At least one entity which satisfies at least one request objective and which has a physical location known to the network is selected, via the network, using the retrieved spatial, temporal, topical, and social data. At least one physical route is mapped between a starting location and the selected entity and is displayed on a display medium.

In another embodiment, the invention is directed to a system comprising: a request receiving module that receives requests over a network for the determination of routes, wherein each request comprises an identification of a requesting user, and at least one objective; a request data retrieval module that retrieves, for each request received by the request receiving module, spatial, temporal, topical, and social data relating to the requesting user and request objectives using a global index of data available to the network; an entity selection module that selects, for each request received by the request receiving module, least one entity which satisfies the objectives of the request, wherein the at least one entity is selected using spatial, temporal, topical, and social data retrieved by the request data retrieval module, and wherein the at least one entity has a physical location known to the network; a route determination module that maps, for each request received by the request receiving module, at least one physical route between a starting location and the entity selected for the request; a route display module that displays, for each request received by the request receiving module, each of the physical routes mapped for the request.

In another embodiment, the invention is directed to a method. A request for a map is received over a network. The request comprises an identification of a requesting user, and at least one map criteria. Spatial, temporal, topical, and social data available to the network which relate to the requesting user and the map criteria are retrieved using a global index of data available to the network. A personalized targeting profile having at least one targeting profile criteria is created via the network, using the retrieved spatial, temporal, topical, and social data. Content available to the network which relates to the at least one targeting profile criteria is matched and displayed on a display medium.

In another embodiment, the invention is directed to a system comprising: a map request receiving module that receives, over a network, requests for maps, wherein each request comprises an identification of a requesting user, and at least one map criteria; a map request data retrieval module that retrieves, for each request received by the request receiving module, spatial, temporal, topical, and social data available to the network relating to the requesting user and the map criteria using a global index of data available to the network; a personalized targeting profile creation module that creates, for each request received by the request receiving module, a personalized targeting profile having at least one targeting profile criteria, wherein the personalized targeting profile is created using spatial, temporal, topical, and social data retrieved by the map request data retrieval module; a content matching module that matches, for each request received by the request receiving module, content available to the network which relates to targeting profile criteria within personalized targeting profiles created by the personalized targeting profile creation module; and a content display module that displays on a display medium, for each request received by the request receiving module, content matched by the content matching module.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
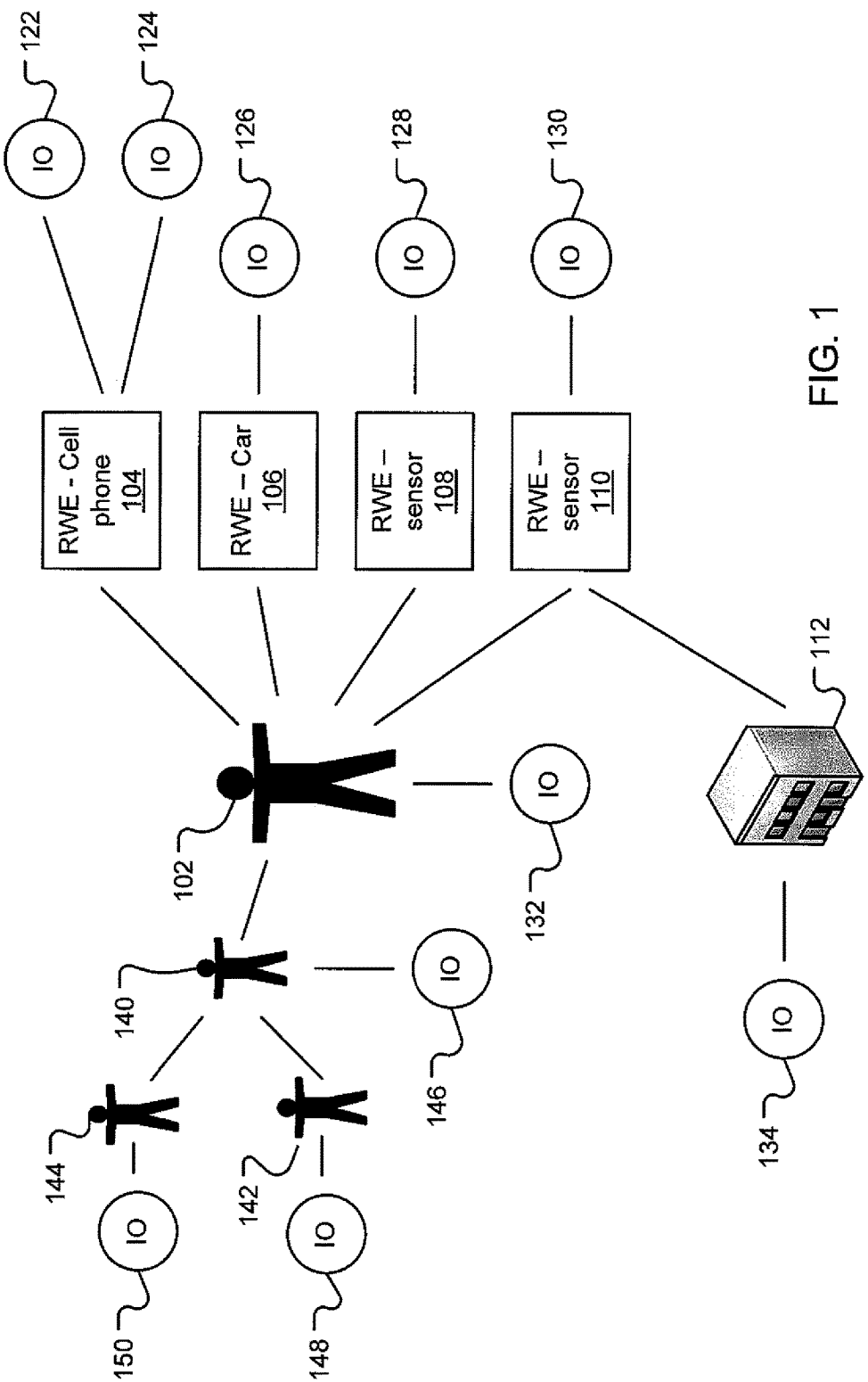
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure an engine is a software, hardware, or firmware (or combinations thereof) system, process or functionality that performs or facilitates the processes, features, and/or functions described herein (with or without human interaction or augmentation).

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE. An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genera of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
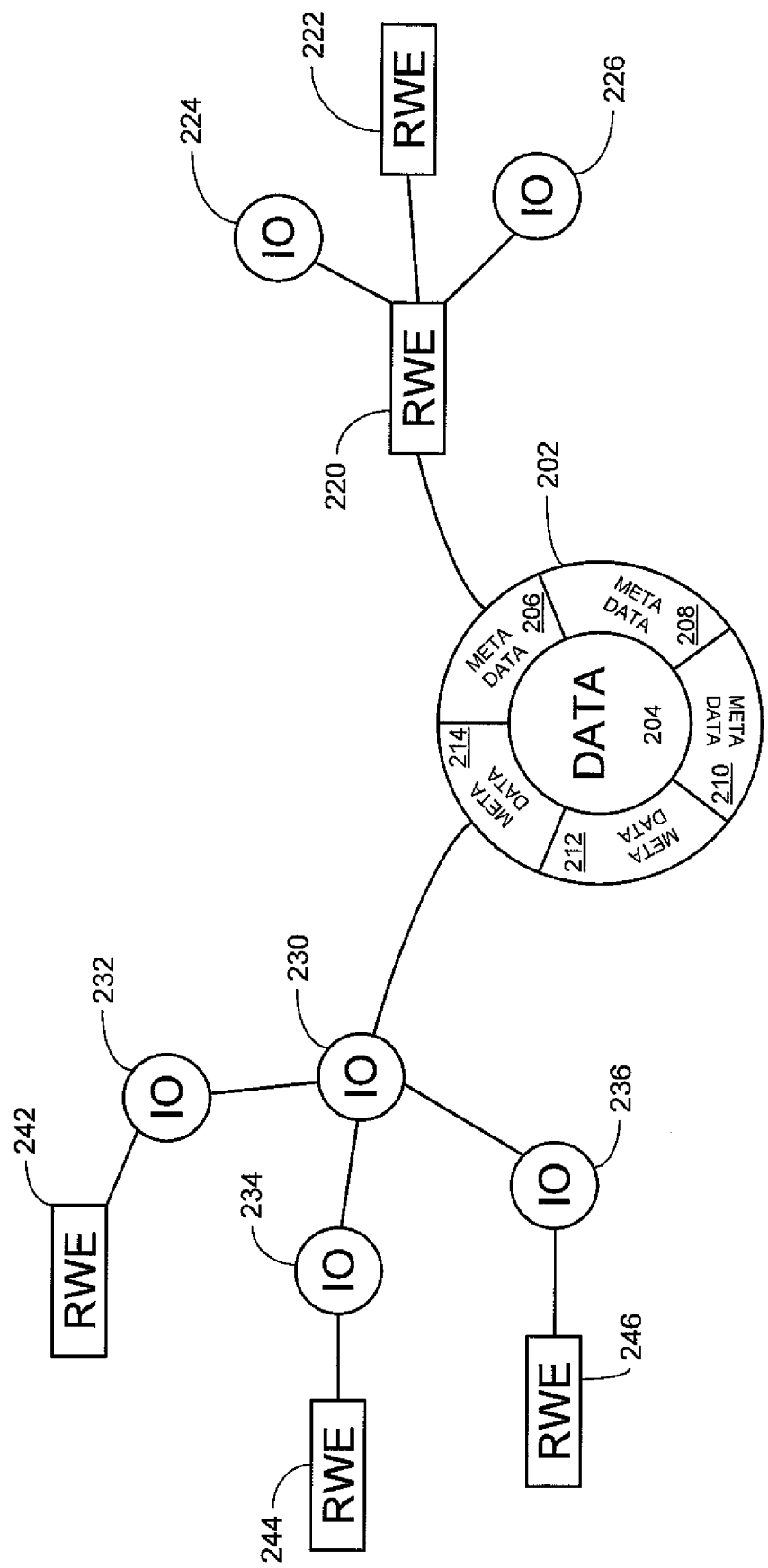
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
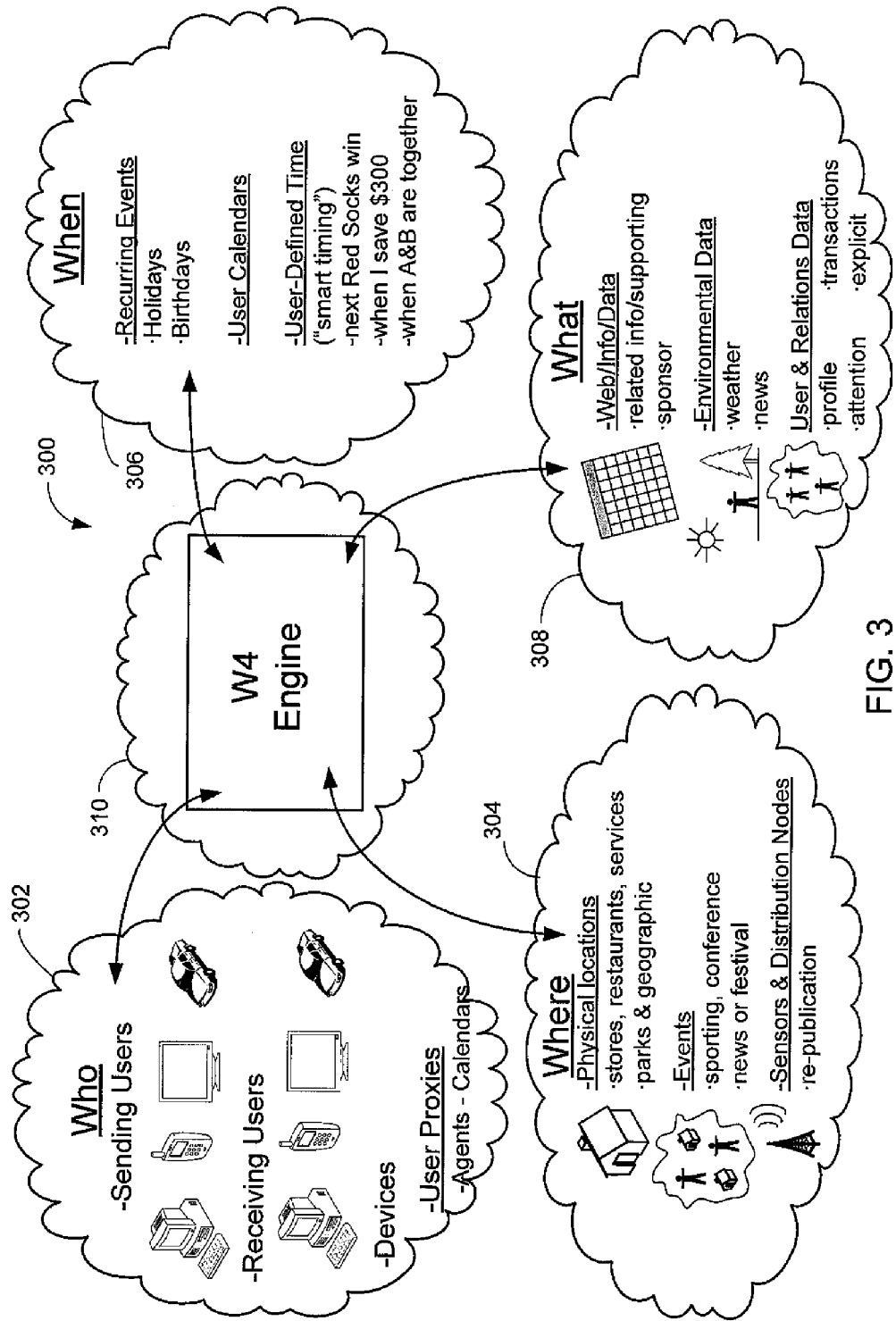
FIG. 3 illustrates a conceptual model of one embodiment of a W4 COMN.

FIG. 3 illustrates one embodiment a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs).

Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
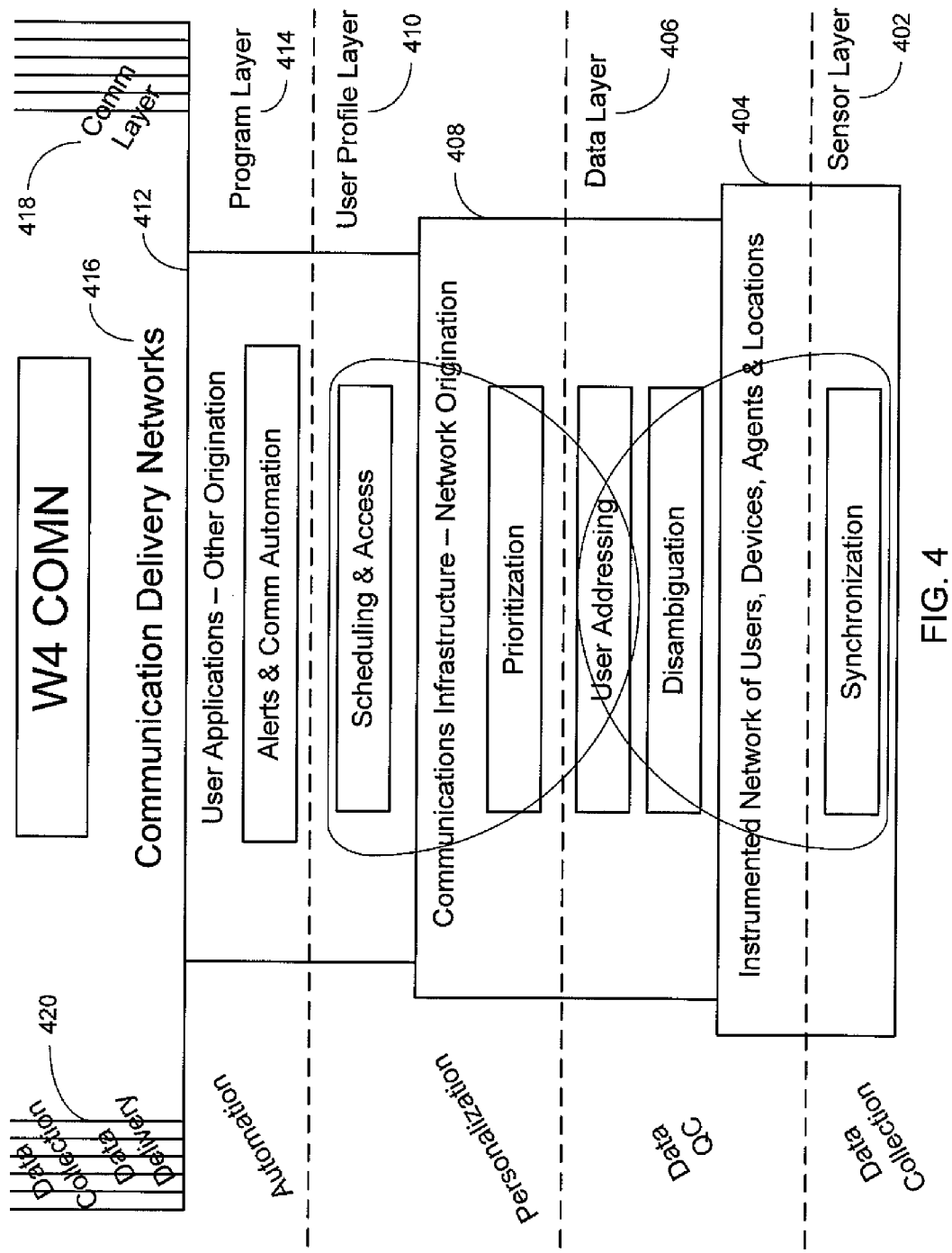
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, OPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photobloging, audio (e.g. telephone call), video (teleconferencing, live broadcast), games, data confidence processes, security, certification or any other W4 COMN process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects of enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
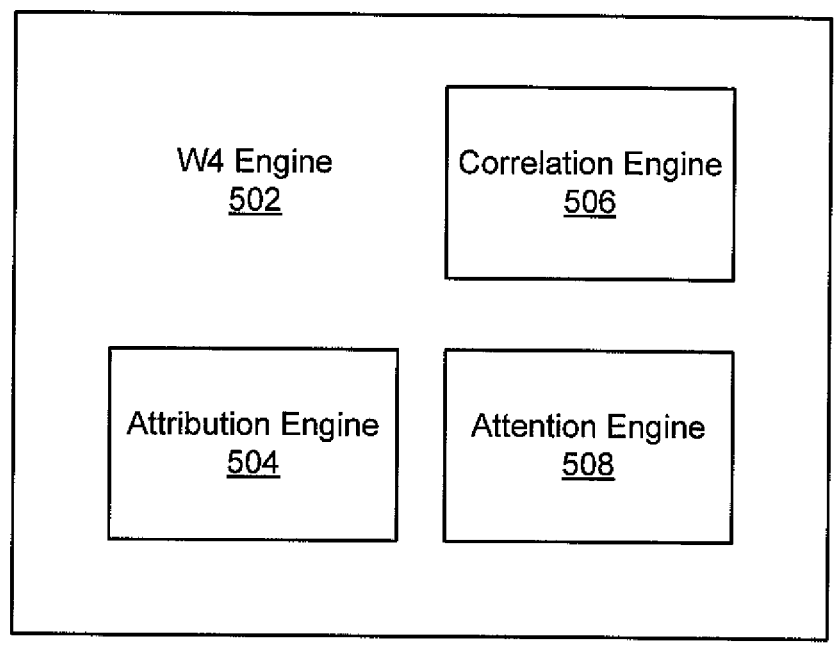
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms. A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
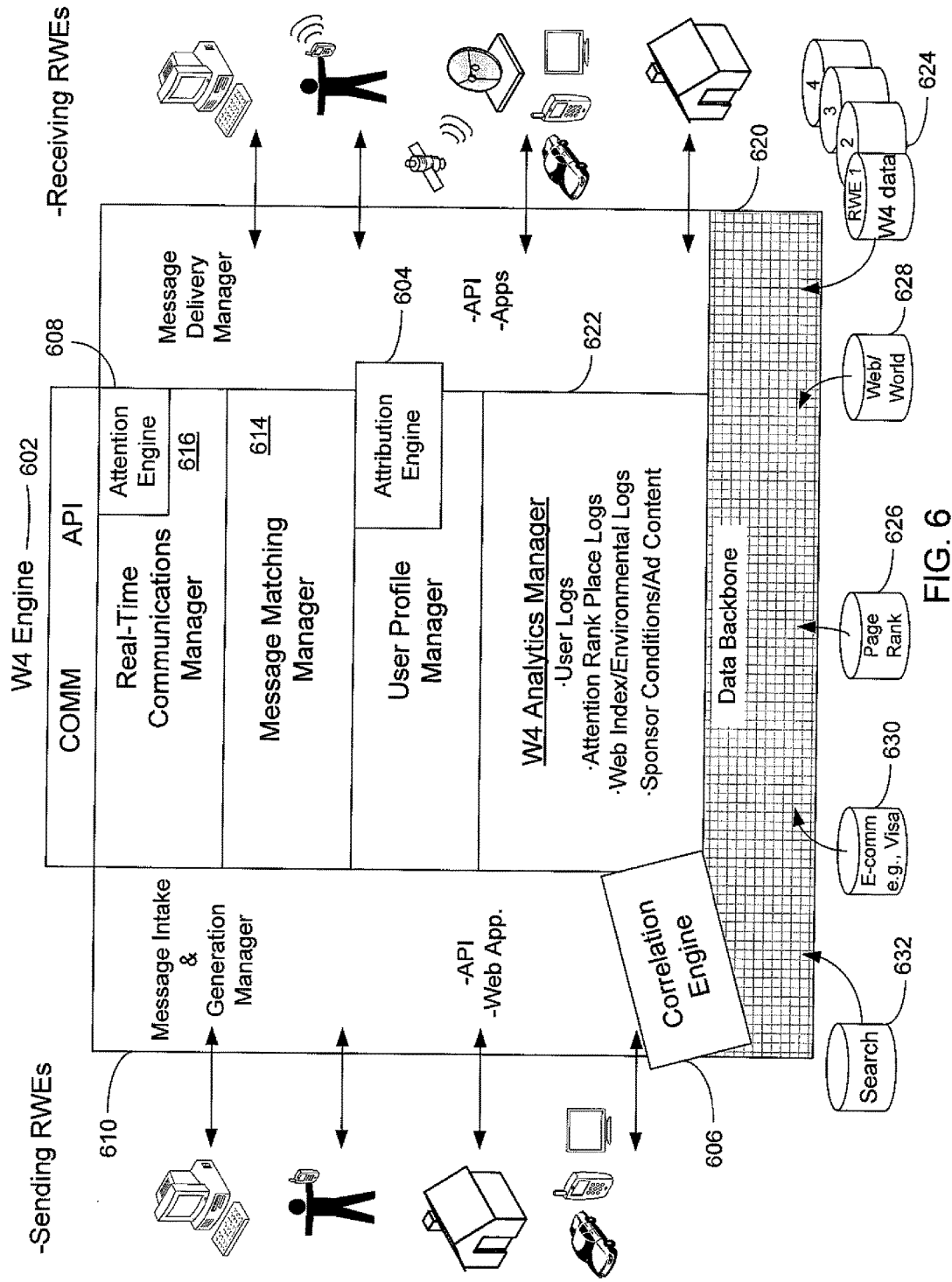
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and data stores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
|---|---|
| Interpersonal communication data | Text-based communications, such as SMS and e-mail |
| | Audio-based communications, such as voice calls, voice notes, voice mail |

TABLE 2-continued

Examples of Interaction Data

| Type of Data | Example(s) |
|---|---|
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Determination and Display of Personalized Distance

In a mobile society, persons are continuously traveling from one point to another. Often, a person wants or needs to know the distance between two real-world locations. Numerous services exist to calculate spatial distance. Such services may be, without limitation, web based services, such as Yahoo! Maps, Mapquest, or may be GPS-based services. Such services calculate spatial distance tied to a specific route and may be able to estimate travel time, either based on average travel time, or based on real-time traffic data. Such services may additionally provide for a small degree of customization, such as finding routes that avoid highways or tolls.

The distances calculated by such services are not, however, typically personalized to any significant degree. A spatial distance does not factor in a person's goals or objectives in traveling between two points. Furthermore, it does not factor in a person's schedule, interests, preferences or social networks in determining the desirability of particular route. A personalized distance can be determined that takes such factors into account. The factors that can be used in determining a personal distance between two points can be categorized as spatial factors, temporal factors, social factors, and topical (or logical) factors.

In one embodiment, calculation of a personalized distance between two real-world entities can begin with determining one or more routes between two real-world entities. One or more routes can be chosen based on a user's preferred mode of travel. For example, a person may prefer to walk or use public transportation rather than driving. Routing can simply choose the shortest available route. Routing can additionally reflect further travel preferences, such as avoiding highways, tolls, school zones, construction areas, and so forth. Given a known route, spatial distance can then be determined for the route. In one embodiment, spatial distance is the length of the route. In another embodiment, the time to travel to a destination can be considered a form of spatial distance.

Spatial distance can be modified by spatial factors not directly related to distance. Such spatial factors may relate to additional spatial dimensions such as height, altitude, a floor on a building, and so forth. Such factors can relate to physical properties of the route or entities having a location on or near the route. For example, if a person values scenery or visually stimulating surroundings, whether natural, or manmade, a route that has a view of a bay or ocean or skyline can be more desirable. If a portion of a route has a reputation for being in poor physical condition or is under construction, the route can be considered less desirable. Spatial factors may additionally include the additional dimension of velocity (i.e. direction and speed) of a user or other entities. Spatial factors may additionally include environmental conditions tied to physical locations, such as local weather conditions.

Spatial distance can then be further modified using temporal factors, social factors, and topical factors. Temporal factors can be generally defined as factors that relate to how the passage of time affects the desirability of a route and the mode of transportation. The most basic temporal factor is the time it takes to travel a route. Travel time on a route can be estimated based on average travel time historically associated with a route. Alternatively, travel time can be more precisely determined by monitoring average speed and travel times from real-time monitors or sensors. Such sensors can be fixed sensors specifically installed along major avenues of travel for monitoring traffic flow. Such sensors can also be user devices, such as cellular telephones or GPSs whose location is continuously monitored and which can thus be used to determine the speed of travel for individual user devices whose physical position is known. In one embodiment, data used to determine travel time on a route may be a combination of many sources of data from multiple sensor networks.

Such travel time can be useful, but can be enhanced by combining it with historical travel time data accumulated over a period of time. For example, on Friday, people may historically leave the office earlier, and traffic predictably suffers a 15 to 20 minute slow down between 6:00 PM and 7:00 PM on major routes out of a city. Thus, the speed of traffic at 5:45 PM may provide an overly optimistic estimate of travel time between 6:00 PM and 7:00 PM for a person whose commute would normally be 30 minutes.

Travel time can also be affected by weather conditions. Thus, when it begins to rain, historically, traffic may suffer a 30 minute slow on major routes out of a city. Thus, if rain is predicted or if it just begins to rain, travel time for such routes may be adjusted accordingly. Travel time can also be affected by local events. For example, a concert may be booked at a large arena downtown for a specific date starting at 7:00 PM. Historical data may indicate that traffic slows down in the vicinity of the arena during concerts, increasing commute times by 10 minutes.

Temporal factors can additionally include temporal data relating to the starting point and ending points of a route. For example, if the destination of a route is a restaurant or a retail location, if the location closes before the route can be fully traversed, the route is undesirable. If the wait time to be seated at a restaurant exceeds, for example, 30 minutes, the route may also be undesirable. If an event is scheduled to occur at a location at a particular time, for example, live music begins at 10 PM, a route that arrives at the location after 10:00 PM may be undesirable.

Temporal factors can additionally include temporal data relating to a specific person. For example, if a person has an appointment, a route that arrives early for the appointment is desirable. If a person typically engages in specific activities at home, such as viewing a specific television program, a route that takes a person to a location away from home, for example, a restaurant, that is so distant that the person will not be able to reach home before the program airs may be undesirable.

Thus, the time it takes to traverse a route, informed by real-time and historical data, and the impact of such travel time on contemporaneous events can be determined for a specific route or a group of routes. Spatial distance, travel time, and events affected by travel time can, in one embodiment, be displayed individually. Alternatively, temporal factors can be used to modify spatial distance to create a personalized distance. The personalized distance reflects the overall desirability of the route. In one embodiment, the distance increases as the desirability of the route decreases. For example, a route that reflects a spatial distance of 10 miles may be increased to 30 miles because of slow travel time or because the route will arrive late for an appointment based on real-time travel estimates. A route which is expressed as a temporal distance of 10 minutes may be increased to 30 minutes or "TL" for too long if the route will arrive late for an appointment based on real-time travel estimates.

In one embodiment, temporal factors can be used as weighting factors or additive factors that are used to modify spatial distance in a consistent manner. Weighting and additive factors can be used to reflect a simple, continuous numerical relationship. For example, if a 10 mile route is projected to have a travel time of 30 minutes, reflecting an average speed of 20 mph, whereas 60 mph is taken to be an arbitrary target travel speed, a weighted distance of 30 miles could be computed by multiplying the travel time by the target travel speed. In another example, an arbitrary increment of 1 mile can be added to spatial distance for every additional minute a person is projected to be late for an appointment. In another embodiment, a pre-defined code or tag could be associated with the spatial distance, e.g. "10L" for ten minutes late, or "TL" for too late or too long.

Weighting and additive factors can additionally or alternatively, be used reflect a discrete intervals used multiplicatively or additionally. For example, if a person is projected to be late for an appointment from 1 to 10 minutes, a multiplier of 1.5 or an addition of 10 miles could be applied to spatial distance, whereas if a person is projected to be 11-20 minutes late, a multiplier of 10 or an addition of 100 miles could be applied to spatial distance.

Spatial distance can thus be weighted by temporal factors in a large number of ways to produce a qualitative personal distance that reflects spatial distance of a route and also reflects the impact of temporal factors on the desirability (or even feasibility) of the route. In one embodiment, the exact methodology for combining spatial distance and temporal weighting factors can vary from person to person, and can be customized to reflect the personality or habits of a person. Thus, a person who hates driving may heavily weight travel time, whereas an obsessively punctual person may heavily weight being late for work or appointments. In one embodiment, the user can explicitly input such preferences. In another embodiment, such preferences may be imputed user behavior which is reflected by sensor data and interaction data for the user accumulated over time.

Spatial distance can additionally be modified using social factors. Social factors can be generally defined as factors that relate to how a person's social relations affects the desirability of a route. A route can be considered more desirable if the route is in proximity to one or more individuals who are in a person's social network or otherwise demonstrate a social relation with a user on the basis of spatial, temporal, or topical associations, correlations, overlaps or degrees of separation.

Such factors could be based on profile data associated with individuals in a person's social network. For example, a route that passes the home address of a close friend can be considered more desirable, as it offers the potential opportunity to drop in on a friend. Such factors could also be based on dynamic, real time data associated with persons in a social network. For example, a route to a location may be considered more desirable if one or more friends or acquaintances are currently present at that location.

Social factors may also make use of interaction or transaction data associated with individuals in a person's social network. For example, a route to a location may be considered more desirable if the location is a business which is frequented or favorably reviewed by one or more friends or relatives. In another example, a route containing roads that have been unfavorably commented on by friends or are habitually avoided by friends can be considered less desirable.

Social network factors can also be used in a negative fashion as well. Thus, if an individual is identified within a person's social network as a person to be avoided, routes that tend to avoid the individual and businesses and locales frequented by the individual may be considered preferable.

Spatial distance can additionally be modified using topical factors. Topical factors can be generally defined as including factors that relate to known information associated with locations, users, and other entities in the environment. Such factors can relate to how a person's interests and preferences, as well as external events, affects the desirability of a route. For example, topical factors may relate to the general area surrounding the route. For if a person is safety conscious, a route that passes through an area that has a high crime rate can be considered less desirable. If a person enjoys shopping for haute couture, a route that passes through an area that has a high density of high end retailers or boutiques may be more desirable. Topical factors may relate to events occurring on or in the vicinity of the route. For example, if a festival is occurring in a neighborhood, a route that passes through the neighborhood may be more or less desirable, depending on whether a person has an interest in the festival or not.

Topical factors may relate to the destination of the route. For example, a route to a location may be considered more desirable if the location is a business which is associated with a topic of interest (or aversion) to the user. For example, if a person is a fan of blues music, a route to a destination associated with blues music (i.e. a blue's club) can be considered more desirable. In another example, if a person doesn't like children, a route to a destination that is rated as a great family destination can be considered less desirable. A route to a location may be considered more desirable if the location is a business which is favorably reviewed by a favorite reporter or news publication or a friend. For example, a route to a restaurant which has received glowing reviews in local publications can be considered more desirable, but may be less desirable if a user's best friend gives the restaurant a bad review. Topical factors can thus be weighted by any known social factor related to the topic.

In one embodiment, social and topical factors can be used in addition to temporal factors as weighting factors or additive factors that are used to modify spatial distance in a consistent manner to produce a personalized distance. In one embodiment, the exact methodology for combining spatial distance and temporal weighting factors can vary from person, and can be customized to reflect the personality, habits, and preferences of a person.

Note that the methodologies described above can be extended to determine a personalized distance which is not tied to a physical route, or even to spatial or temporal dimensions. In one embodiment, the route is a straight line between the starting location and the ending location, a relative distance from a central third point, or a calculation based on a cluster of locations, and can be adjusted by social and topical factors.

In yet another embodiment, spatial and temporal dimensions are ignored and the personalized distance between the starting location and the ending location is based on social and topical factors relating to the requesting user, the starting and ending location, and all known RWEs and IOs associated with the user and the starting and ending location Such a personalized distance becomes, in effect, a metric which measures how closely the starting and ending locations relate to the requesting user's interests and associations.

The embodiments of the present invention discussed below illustrate application of the present invention within a W4 COMN. Nevertheless, it is understood that the invention can be implemented using any networked system which is capable of tracking the physical location of users and media enabled electronic devices, and which is further capable of collecting and storing user profile data, location data, as well as temporal, spatial, topical and social data relating to users and their devices.

A W4 COMN can provide a platform that enables the determination of personalized distances between two or more real world objects that includes spatial factors, temporal factors, social factors, and topical factors. The W4 COMN is able to achieve such a result, in part, because the W4 COMN is aware of the physical location of persons and the relative location of places, and is further aware of the preferences of such persons and places and their relationship to one another and to the greater network.

Figure 7:
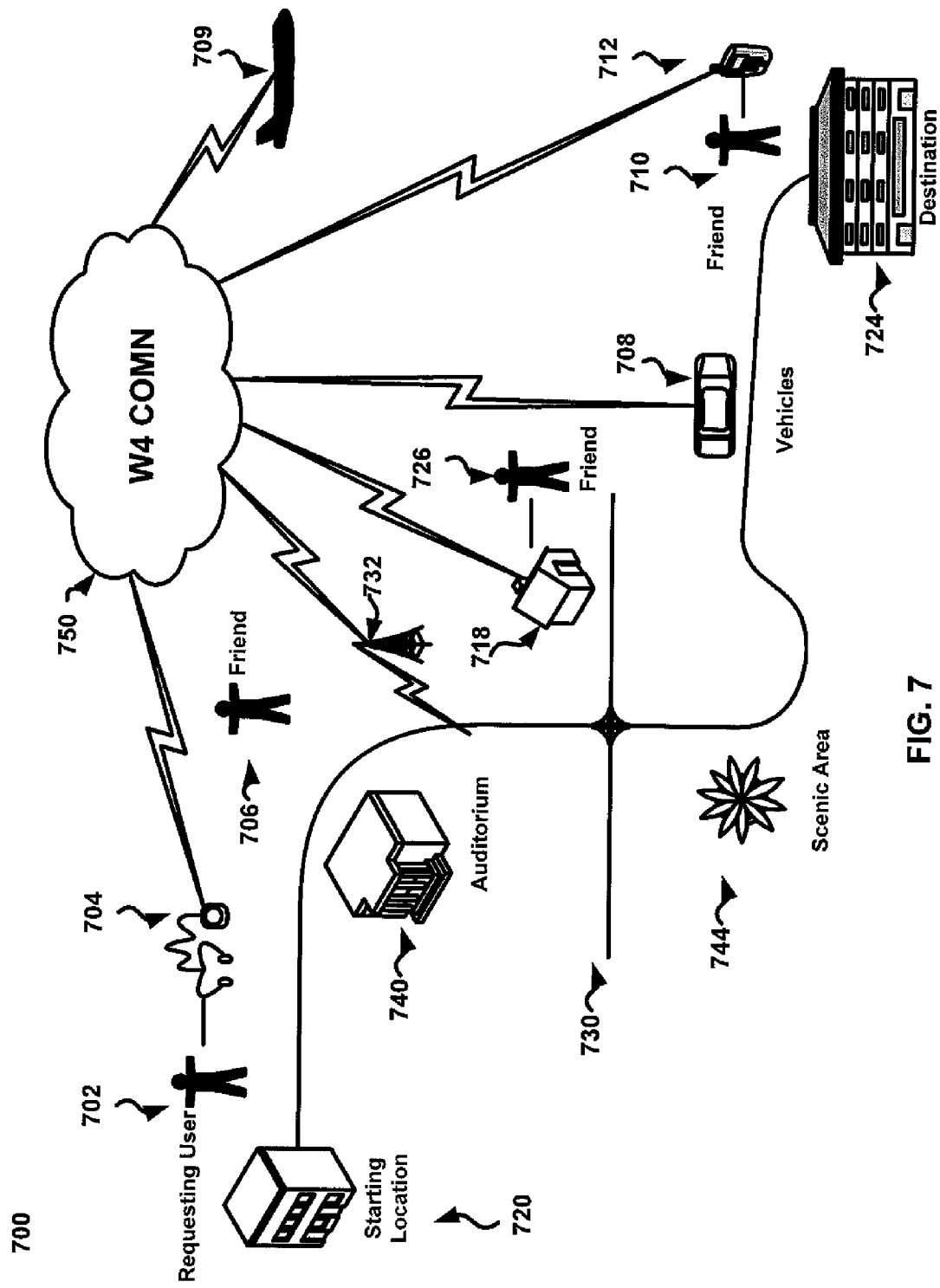
FIG. 7 illustrates one embodiment of the use of a W4 COMN for the determination of personalized distances between two or more real world objects

FIG. 7 illustrates one embodiment of the use of a W4 COMN for the determination of personalized distances between two or more real world objects.

In the illustrated embodiment, an individual 702 wishes to determine a personalized distance between a starting location 720 and an ending location 724. In one embodiment, a user 704 enters a personalized location request using a user proxy device 704, for example a PDA or portable media player, which is transmitted to a W4 COMN 750. In one embodiment, the request comprises the starting location 720 and the ending location 724. In alternative embodiments, the user may choose to enter more than two locations, which in one embodiment, can comprise a starting location 720 and an ending location 724 and one or more additional locations, for example an auditorium (i.e. to buy event tickets) and a friend's house 718 (i.e. to stop and visit.)

At least one physical route 730 exists between the starting 720 and ending locations 724. The route can be identified by a mapping application, such as, for example, Yahoo Maps, that is capable of plotting routes along highways and roads between two locations. Alternatively, the route can be specified in the personalized location request. The routes may be, without limitation, routes proceeding along roads and highways, may be a pedestrian route, and may include segments utilizing mass transit. Where a route request comprises more than two locations, each route will include all locations in the route request, and may provide alternate routes with differing ending locations. For example a route request starting at location 720 and including locations 740, 718, and 724 could generate alternate routes ending at location 718 and location 724.

There are fixed traffic sensors 730 along all or part of the route. The sensors are in communication with the W4 COMN and continuously transmit real-time data including at least traffic information to the W4 COMN. Additionally or alternatively, the W4 COMN can track the location of network user devices which are traveling on the route 730. For example, the network can determine the location of cell phones by triangulating cellular signals or through the use of embedded GPS. Vehicles 708 may additionally contain sensors or geo-locatable devices which includes the vehicles rate, direction, and mode of motion. Such vehicles may include the user's vehicle. Additionally or alternatively, the W4 COMN can track alerts and traffic advisories transmitted by local authorities, or data provided by the local 911 network (not shown.) Additionally or alternatively, the W4 COMN can track the movement of air traffic 709 as well as vehicular traffic.

The route begins at a starting location 720. The starting location can be a physical point, an address, or a real-world entity, such as a building or an individual (e.g. the requesting user.) The route 730 proceeds past a municipal auditorium 740 that periodically hosts events such as concerts. The route additionally passes near the home 728 of a friend of the user 702. The route additionally passes a scenic area 744 such as a shoreline, an overlook, or a clear view of a city skyline. The location terminates at an ending location 724. The ending location can be a physical point, an address, or a real-world entity, such as a building or an individual whose position is known to the network (e.g. a friend of the requesting user with a device whose position is known through, e.g. GPS.)

The requesting user 702 has three friends 706, 710, and 726 known to the network. User 706 is a friend of requesting user 702, but has no association with the route 730. User 726 has a home located 728 on the route 730. User 710 is currently located at the ending location 724. User 710 has a proxy device 712, such as a smart phone, that is in communication with the W4 COMN and whose geographical position can be determined, for example, by GPS technologies or triangulation of cellular signals.

Physical locations of any type, such as starting location 720 and an ending location 724, can further contain or be associated with proxy devices known to the network. Such devices can include proxy devices associated with, without limitation, other users' proxy devices, vending machines, printers, appliances, LANs, WANs, WiFi devices, and RFID tags which can provide additional information to the network. All of the entities shown in FIG. 7 may be known to the W4 COMN, and all network connectable devices and sensors may be connected to, or tracked by, the W4 COMN (note, all possible connections are not shown in FIG. 7.)

Figure 8:
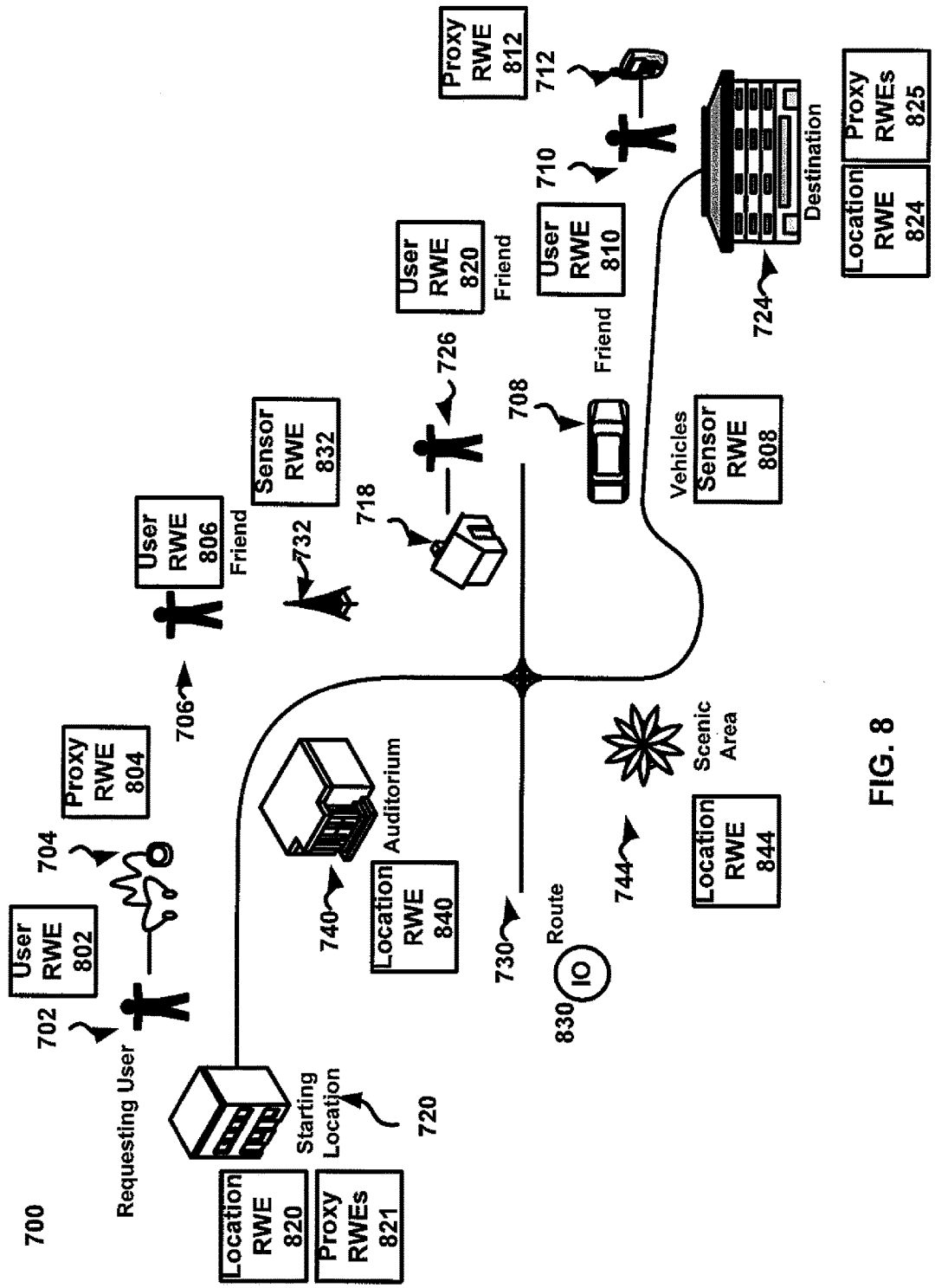
FIG. 8 illustrates one embodiment of how the users and devices shown in FIG. 7 can be defined to a W4 COMN.

FIG. 8 illustrates one embodiment of how the objects shown in FIG. 7 can be defined to a W4 COMN.

Individuals 702, 706, 712 and 726 are represented as user RWEs 802, 806, 810 and 826 respectively. Each individual's devices are represented as proxy RWEs 804, and 812. Locations 720, 724, and 740 are represented as location (or business) RWEs 820, 824, and 840. The traffic sensor 730 is represented as a sensor RWE 830. The route 730 is represented as a IO 830 containing route information. The scenic area is represented by an RWE which includes information on the location and other attributes of the scenic area. All RWEs can have additionally have, without limitation, IOs associated with RWEs proxies, friends, and friends proxies.

Figure 9:
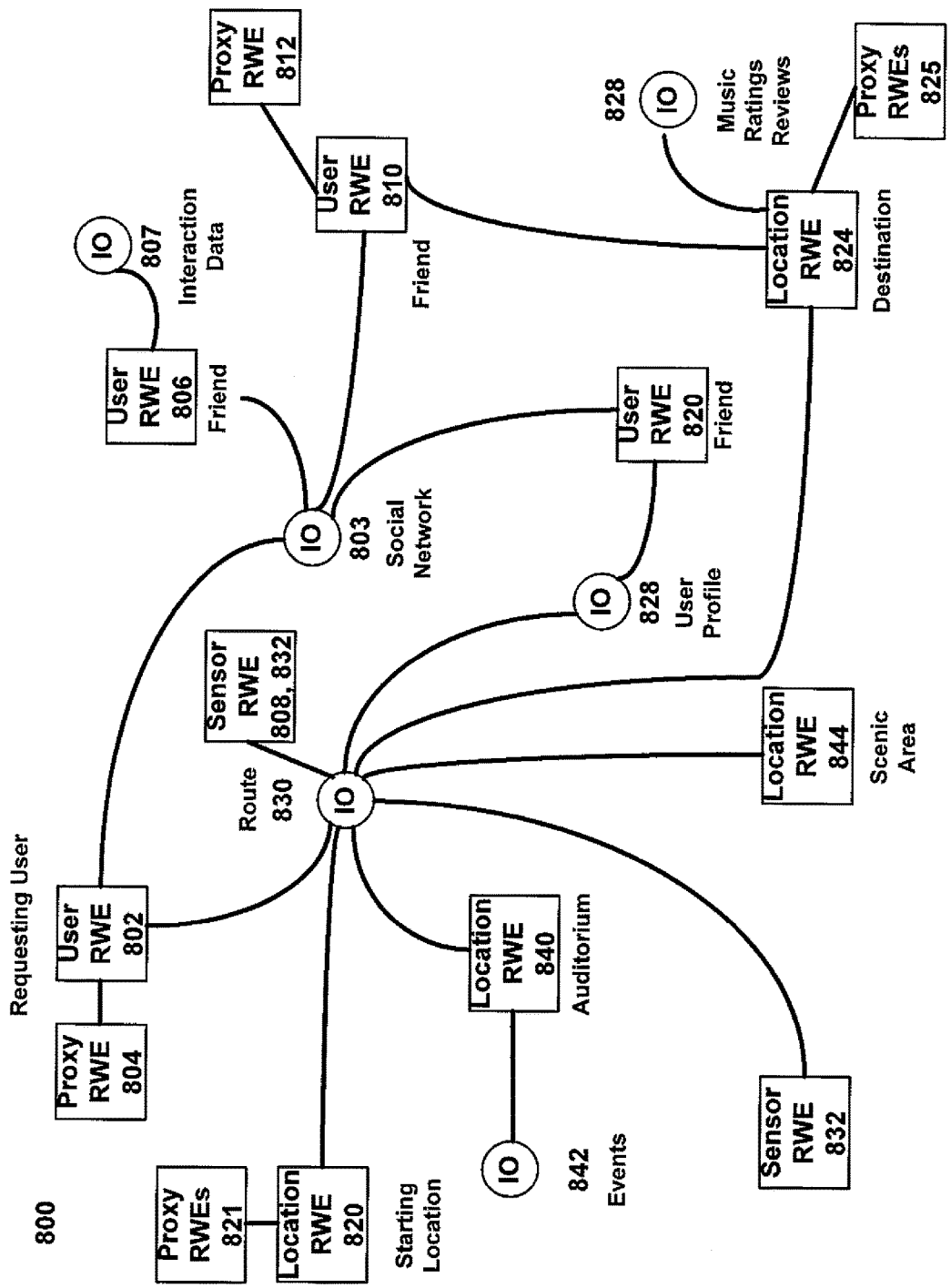
FIG. 9 illustrates one embodiment of a data model showing how the RWEs shown in FIG. 8 can be related to entities and objects within a W4 COMN.

FIG. 9 illustrates one embodiment of a data model showing how the RWEs shown in FIG. 8 can be related to entities and objects within a W4 COMN.

The RWE for the requesting user is associated with a route IO 830. The route IO 830 includes, in one embodiment, sufficient data to fully define the physical route, such as road segments and distances or a set of GPS coordinates. The route IO is directly associated with a set of RWEs: RWE 820 representing the starting location of the route; RWE 830 representing a traffic sensor on the route; RWE 840 representing a municipal auditorium on or near the route and a scenic area 844; and RWE 824 representing the ending location.

In the illustrated embodiment, the route IO is further associated with two IOs relating to topics: IO 828 representing the user profile of an RWE 820 representing a friend 820 of the requesting user whose home address is located on or near the route. Note that the route IO may be directly related to any or all IOs associated with physical locations along the route, but is also indirectly related to an unbounded set of IOs related to spatial, temporal, and topical factors related to the route and requesting user. For example, in FIG. 9, the route is indirectly related to user 802's friends 806, 810, and 820 through user 802's social network. In FIG. 9, every IO shown is related directly or indirectly to the route 830.

The requesting user RWE is associated with friend/user RWEs 806, 810, and 820 through a social network represented by an IO relating to a topic 803. User RWE 806 is associated with one or more interaction data IO that can include, without limitation, communications relating to ending location RWE 824 and other users or locations. User RWE 810 is associated with the ending location RWE 824, for example, by an association indicating the user is physically present at the location. User RWE 810 is also associated with a user proxy device RWE 812 whose physical location is known.

The location RWE 840 for the municipal auditorium is further associated with an IO having information on events occurring at the auditorium, including a calendar with dates and times of events. The location RWE 824 for the destination is further associated with one or more IOs relating to topics 828 which may include, without limitation, a calendar of live music to be performed at the destination, ratings by customers of the destination location, or reviews of the location by local media.

In one embodiment, the relationships shown in FIG. 9 are created by the W4 COMN using a data modeling strategy for creating profiles and other types of IOs relating to topics for users, locations, any device on the network and any kind of user-defined data. Using social, spatial, temporal and topical data available about a specific user, topic or logical data object, every entity known to the W4 COMN can be mapped and represented against all other known entities and data objects in order to create both a micro graph for every entity, as well as a global graph that relates all known entities with one another and relatively from each other. In one embodiment, such relationships between entities and data objects are stored in a global index within the W4 COMN.

Figure 10:
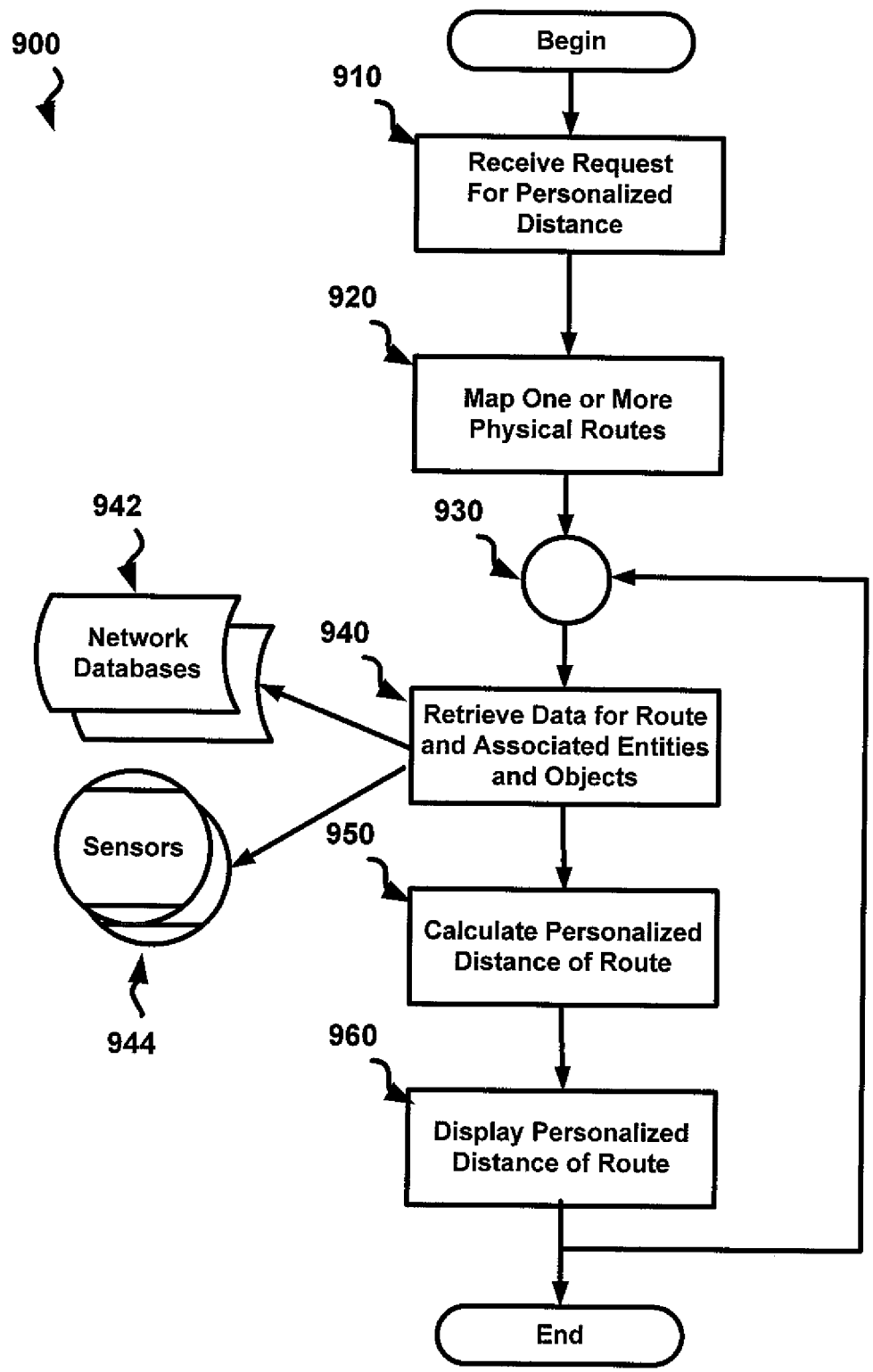
FIG. 10 illustrates one embodiment of a process 900 of how a network having temporal, spatial, and social data, for example, a W4 COMN, can be used for the determination of personalized distances between two or more real world objects.

FIG. 10 illustrates one embodiment of a process 900 of how a network having temporal, spatial, and social data, for example, a W4 COMN, can be used for the determination of personalized distances between two or more real world objects.

A request is received for the calculation of a personalized distance 910 between real-world entities, wherein the request comprises two real-world entities corresponding to a starting location and an ending location. The request may additionally include a physical route between the starting location and an ending location or other criteria. The request may be for the current time, or may be for a future point in time. One or more physical routes between the starting location and the ending location are mapped 920. For every route 930, data is retrieved 940 from network databases 942 and network sensors 944 for entities and objects associated with the route, wherein the network databases contain spatial, temporal, social, and topical data relating to entities and objects within the network. In one embodiment, the network databases 942 include a global index of RWE and IO relationships maintained by the W4 COMN. The spatial, temporal, social, and topical data is used to calculate a personalized distance 950 using one or more embodiments of methodologies discussed above. The personalized distance is then displayed 960 for each route.

Figure 11:
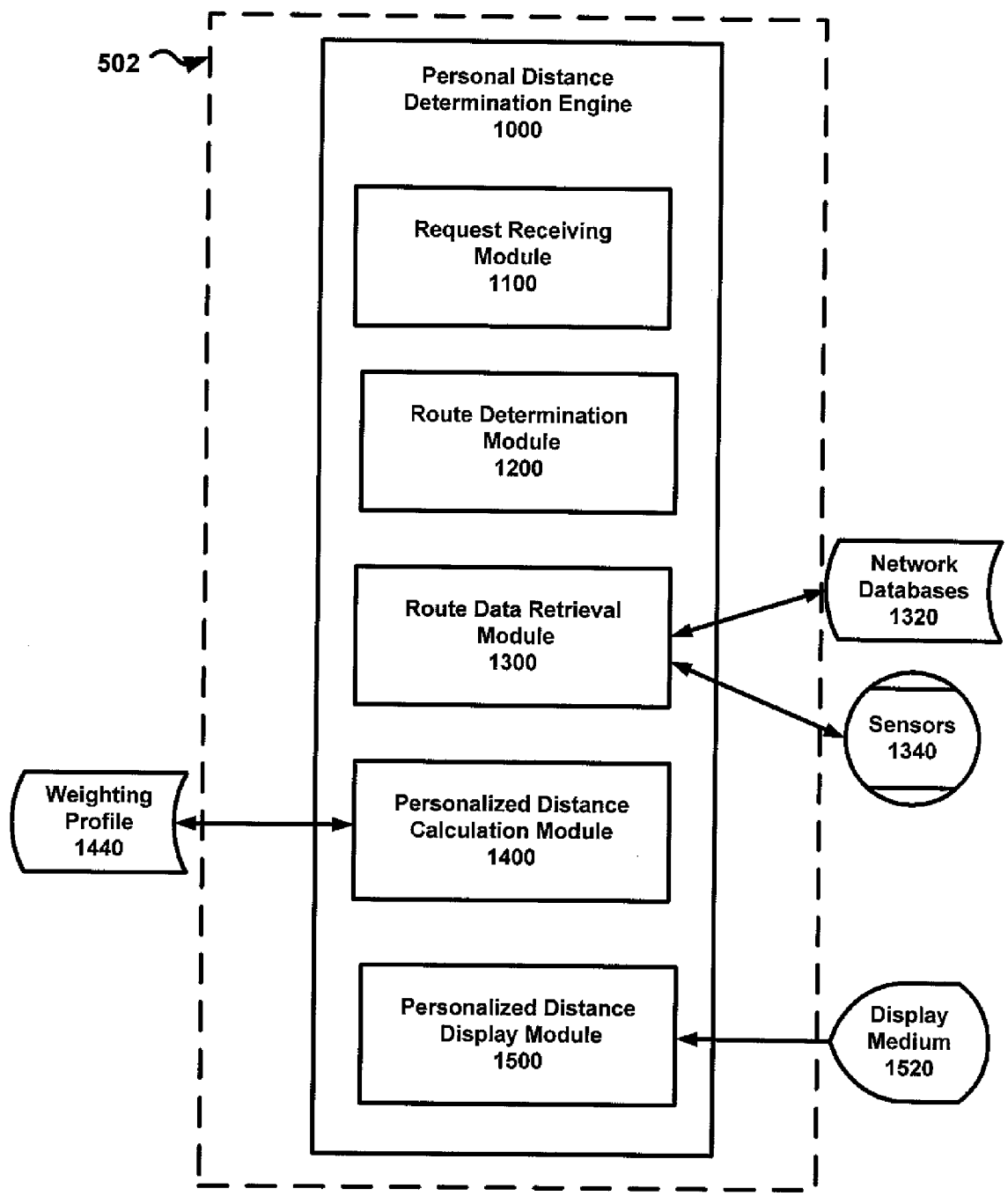
FIG. 11 illustrates one embodiment of a personal distance determination engine 1000 that is capable of supporting the process in FIG. 10.

FIG. 11 illustrates one embodiment of a personal distance determination engine 1000 that is capable of supporting the process in FIG. 10. In one embodiment, the personal distance determination engine 1000 is a component of a W4 engine 502 within a W4 COMN and may use modules within the W4 engine to support its functions.

A request receiving module 1100 receives requests for the calculation of personalized distances between real-world entities, wherein the request comprises at least two real-world entities corresponding to a starting location and an ending location. The request may additionally include a physical route between the starting location and the ending location. A route determination module 1200 maps one or more physical routes between the starting location and ending location. A route data retrieval module 1300 retrieves spatial, temporal, social, and topical data from network databases 1320 and sensors 1340 for entities and objects associated with a route. A personalized distance calculation module 1400 uses retrieved spatial, temporal, social, and topical data to calculate a personalized distance using one or more embodiments of methodologies discussed above. A personalized distance display module 1500 displays personalized distance on a display medium 1520.

In one embodiment, the request receiving module provides an interface for entry of personalized distance requests. The interface may be a graphical user interface displayable on computers or PDAs, including HTTP documents accessible over the Internet. Such an interfaces may also take other forms, including text files, such as emails, and APIs usable by software applications located on computing devices. The interface provide. In one embodiment, a personalized distance request can be entered on a mapping application interface, such as Yahoo Maps. The request may be for the current time, or may be for a future point in time.

In one embodiment, route determination module may determine routes using a mapping engine such as that provided by Yahoo! Maps that is capable of mapping a route between two locations. Alternatively, the route may be presumed to be a straight line between two locations, a relative distance from a central third point, or a calculation based on a cluster of locations. Alternatively, no physical route may be determined. In one embodiment, the route determination module returns multiple physical routes. The routes can be routes consisting entirely of roads and highways, pedestrian ways, public transportation, or any combination thereof.

In one embodiment, the distance display module displays personalized distance on a user interface. The interface can be a graphical user interface displayable on computers or PDAs, including HTTP documents accessible over the Internet. Such an interface may also take other forms, including text files, such as emails, and APIs usable by software applications located on computing devices. In one embodiment, the personalized distance for one or more routes can be listed as text or numbers. The factors used to calculate the personalized distance can be listed on same display as text or numbers so that the user can understand the basis of the calculation. In one embodiment, distances above and below a user defined threshold can be automatically excluded or preferred.

In one embodiment, a personalized distance can be displayed as an overlay of a graphical display of a map of the route to which the personalized distance relates. For example, the personalized distance could be displayed as a colored highlight over the length of the route wherein the color indicates the magnitude of the distance. For example, red could signify a distance of 20 miles or greater, or, alternatively, a route wherein the personalized distance is greater than twice the spatial distance. The personalized distance could also be displayed as a text tag on the route. Entities and objects which were used in the personalized distance calculation and which have a physical location close to the route can additionally be displayed as text tags or symbols on the map. In an alternative embodiment, the color coding of routes based on rank of users' likely preferences (e.g. the best route is colored green, the worst, brown.)

In one embodiment, in a W4 COMN, the route data retrieval module 1300 can be component of a correlation engine 506, and makes use of data relationships within the W4 COMN to retrieve data related to a route. In one embodiment, the network databases 1320 include a global index of RWE and IO relationships maintained by the W4 COMN.

For example, referring back to FIG. 9, a route IO 830 can be associated with a number of objects and entities that relate to data that can be used in calculating a personalized distance for the route. In the illustrated embodiment, the route IO relates to real-time sensors 832 that are periodically or continuously polled for data. Sensor data can include traffic data, user presence and motion data, as well as environmental data, such as temperature, visibility, and weather. Traffic sensor data can be used to calculate transit time on the route. Other types of sensed data can additionally be used as factors in computing personalized distance. For example, if it starts to rain, transit times can be increased based on historical data. Additionally or alternatively, if the requesting user RWE 820 hates driving in rain (e.g. as indicated in profile or interaction data), rain can be can be a subjective factor in a personalized distance calculation.

The route IO 830 further relates to a location RWE 840, an auditorium having a location near the route. The RWE 842 is associated with an events IO that can include a calendar of events. If there is an event scheduled for the time the route will traversed, the event can be a factor in a personalized distance calculation. The route IO 830 further relates to an IO relating to a topic for a scenic location near the route. If the requesting user 802 values scenic views (e.g. as indicated in profile or interaction data), the scenic location can be a factor in a personalized distance calculation.

In the illustrated embodiment, the route IO 830 is owned by the requesting user RWE 802. The user RWE 802 is associated through a social network with three user RWEs 806, 810 and 820 that are friends of the requesting user. The friend RWEs each relate to data that can be factors in calculating a personalized distance for the route. User RWE 806 can have interaction data or profile data relating to the destination RWE 824, such as emails or text messages expressing opinions about the destination (e.g. bad food, great music.) User RWE 810 is physically present at the destination, possibly increasing the attractiveness of the location. The profile IO 828 of user/friend RWE 820 indicates the user RWE's home is near physically near the route, and hence, it would be easy for the requesting user to drop in.

The destination location RWE 824 has topical and other IOs 828 associated with it that contain additional data that can be factors in a personalized distance calculation. A music calendar may indicate a musical performance at a specific time. Users outside of the requesting RWE's social networks may have rated the destination location for food, ambience, and service. Local media may have reviewed the destination location.

In one embodiment, the personalized distance calculation module 1400 can weight spatial, temporal, social, and topical factors differently. Such weighting may be determined automatically based on the context of the request. Since each context will have a potentially unbounded set of associated data, the personalized distance calculation module 1400 can, if sufficient information is present, determine the category of the most important factor depending on context. For example, shop hours (a temporal factor) become the primary factor for a destination of a distance to a location that is about to close, but are mostly ignored for calculations in the middle of business hours. When, for example, a friend is presently shopping there (a social factor), such a social factor becomes the most important factor for weighting a spatial distance.

Figure 12:
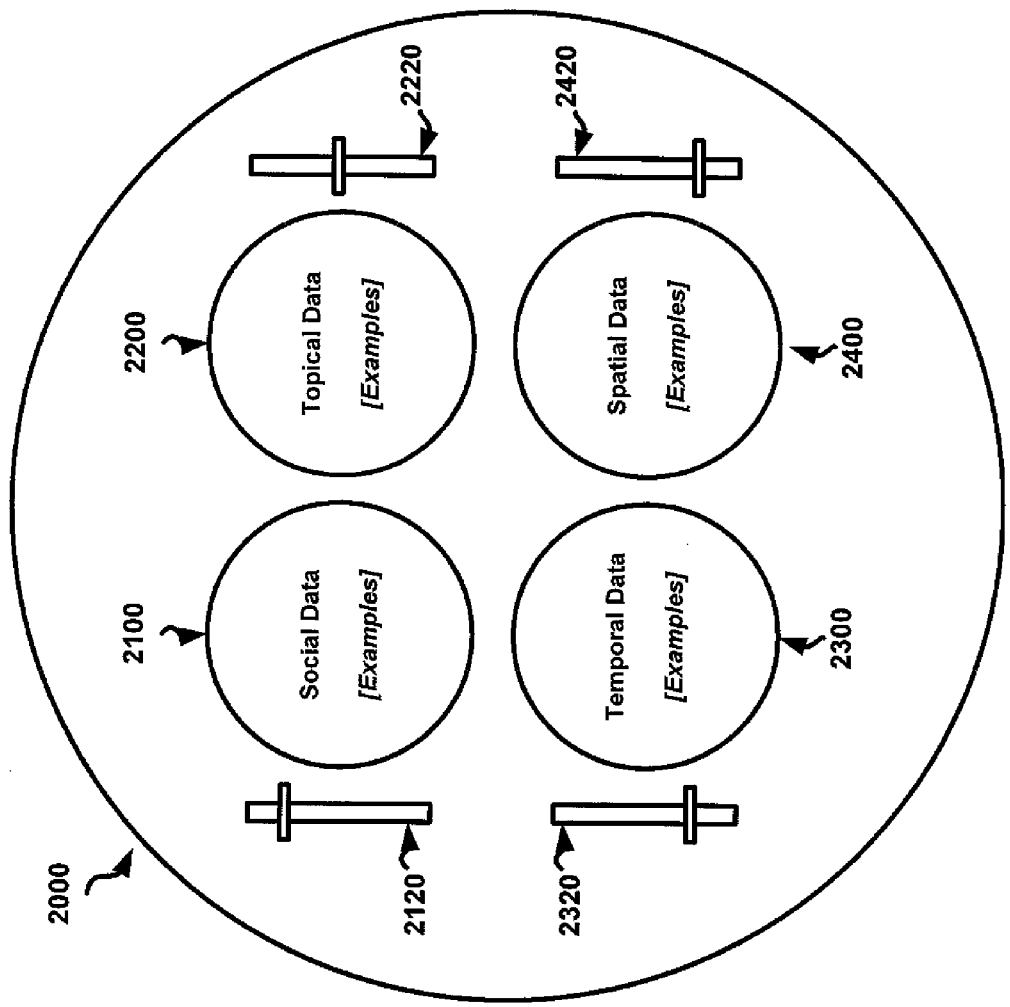
FIG. 12 illustrates a user interface for adjusting the weights of spatial, temporal, social and topical factors in a personalized distance calculation.

In one embodiment every RWE and IO associated with a personalized distance calculation has at least one data point for spatial, temporal, social, and topical factors, and can have large sets of data points for each type of factor. Such factors can be sorted and ranked for weighting a personalized distance calculation. Alternatively, or additionally, a users weighting preferences are stored on the network in a weighting profile, which can be additionally maintained using a user interface such as that shown in FIG. 12. The interface 2000 can be used to apply differential weights to spatial 2400, temporal 2300, social 2100, and topical factors 2200 using sliders 2420, 2320, 2120, and 2200.

Objective-Based Routing and Mapping

Typically, when users enter a request for a route into a mapping and routing application such as, for example, Yahoo! Maps, the user specifies a beginning point and an ending point with, perhaps a few basic parameters such as, for example, avoid highways or tolls or take public transportation. As discussed above, such conventional routing may be enhanced by calculating a personalized distance for the route.

Often, however, a user may have more complex objectives in mind than simply proceeding from a starting point to an ending point including knowing what type of location they desire but not the exact location of any instances of such a location. A user may also wish to enter a multipoint routing request that explicitly states a time constraint, such as, for example, a route including three specific locations in the possible shortest time, the most scenic route or a route known to the user or a trusted source. Thusly, a user may also wish to enter a request composed of criteria that are completely unrelated to spatial or temporal dimensions. For example, a user might wish to enter a routing request for a type of place, such as a sushi restaurant or bar, near a group of persons the user is going to meet at a specific time. In another example, a user might wish to enter a routing request for two specific places making sure to avoid another person, place or thing.

Thus, routing requests can be specifically enhanced by allowing the entry of routing requests that include spatial, temporal, social, and topical objectives or constraints. Spatial objectives can be physical locations or proximity requests designated by a spatial position and radius, a bounded spatial area and distances, or by name. A spatial position can be expressed any way of designative a physical point, such as an address or GPS coordinates. A spatial area can be any bounded physical area, such as a country, state, city, neighborhood, or an arbitrary geometrical area, such as a 10-mile radius from a specific position, such as a user's current position. A name can be the name of any entity whose location is known, such as a business or an event, city, or state, and so forth.

A spatial objective can also be a user or group of users whose position or relative positions can be determined by the network. Such an objective can target the location of one or more individuals. Such a location can be the current physical location of the individuals, may be home or work addresses of the individuals, or can be the projected position of the individuals at a future point time. Such an objective can be positive, such as a request to preference specific physical locations for routing or types of physical locations including maximum and minimum proximities to stay with or avoid people, places or things, e.g. for a route to meet friends, or negative, such as a request to avoid a specific person or people.

A temporal objective can be expressed as a known specific target time, such as 8:30 PM today, an unknown specific target time, such as when a specific contact or event happens, a duration of known time, such as 8:30-9:30 PM today, or a duration of an unknown time, such as two hours after it rains. Where a routing request has multiple objectives, for example, three target locations, a specific time can be stated for each objective, and a temporal order or condition can be stated. A specific time can have a tolerance, such as ±30 minutes. A temporal objective can be stated as a constraint, such as no later than 11:30 PM today, or after 3:30 PM. A temporal constraint can also be stated as an offset from an event, such as 2 hours before a concert, or 1 hour before a user's next appointment. A temporal objective can be placed well into the future, for example, a date more that one month in the future.

A social objective is any kind of non-spatial objective that refers to a person, a group of persons, or a class of persons, which can include, for example, the behavior, or preferences of such persons. A person can be a specific individual known to a user, e.g. Bob Jones, or a specific individual not known to user, e.g. John Smith as well as a known or unknown conditional individual expressed as a set of spatial, temporal, social and topical criteria. A group of persons can be a list of specific individuals, or can be a predefined group, such as individuals in a user's social network or in a user's family. A class of persons can be a general description of attributes of user's that fit a specific profile, such as persons between the ages of 18 to 25 who attended a specific high school, or a satisfy specific criteria, such as persons who pass a specific location at least three times a week.

A social objective can target the behavior of one or many individuals. Such behavior can include routes traveled by such individuals, retailers or restaurants frequented by such individuals, locations visited by such individuals, or the hours that such individuals are at home or are at work. Such objectives can be positive, such as a request for a route that includes roads used by friends, or negative, such as a request to avoid restaurants frequented by a specific individual or those not well reviewed by friends.

A social objective can target the preferences of one or more individuals. Such preferences can include general categories such as the type of food preferred by such individuals, the type of music disliked by such individuals. Such preferences can relate to specific locations, such as a favorite nightclub, or a favorite city or neighborhood within a city. Such preferences can relate to other persons, such as persons liked or disliked by such individuals. Such preferences can relate to time preferences, such as a preferred bedtime. Such preferences can relate to travel preferences, such as a preference to travel no more that 30 minutes to a location. Such objectives can be positive, such as a request for a route to a friend's favorite nightclub, or negative, such as a request to avoid restaurants serving food of a type disliked by a friend.

A topical or logical objective is any kind of objective that refers to a topic or a category that is not spatial, temporal, or social. Such topics can be specific or generic. Such topics may refer to genera of locations, such as parks or scenic locations. Such topics can relate to specific known locations, such as Paris, or specific unknown locations like the biggest comic book store in the city. It should be noted that a topical reference to a location or type of location can be an alias for a spatial reference, such as, for example, any diner within a city, or can be a topic that relates to a location, for example, nightclubs that play music relating to Paris.

Such topics can relate to any topic, e.g. food and can be specific or generic. For example, a food topic can be a reference to a specific dish or drink, such as pasta carbonara and Napa Valley Merlot, or a generic reference to a type of food, such as sushi or soup. Such topics can relate to any interest or activity, e.g. music or other types of entertainment, and can be specific or generic. For example, such topics can relate to a specific musical group or can relate to genera of music, e.g. blues. A topical objective can relate to events. For example, an event topic can relate to a specific event, such as a festival, or can relate to categories of events, such as art openings. Topical objectives can be positive, such as a request for a route to an art opening, or negative, such as a request to avoid night clubs which play a particular genera of music.

Such objective based routing requests can be implemented using any networked system capable of tracking the physical location of users and media enabled electronic devices, and which is further capable of collecting and storing user profile data, as well as temporal, spatial, topical and social data relating to users and their devices. One such networked system is a W4 COMN. FIG. 7 illustrates one embodiment of the physical components of a portion of a W4 COMN that can support objective-based route requests.

Referring to FIG. 7, a requesting user 702 is currently at a specific location 720. The simplest type of routing request is point-to-point, for example, a request for a route from location 720 to location 724. One to many physical routes can be mapped between the points using conventional mapping and routing techniques (available roads, shortest routes, avoid tolls, and so forth). Spatial, temporal, topical, and social data relating to each of the routes can then be retrieved, and a personalized distance can be computed for each route. In one embodiment, the route having the shortest personalized distance is then chosen.

A point-to-point request can be qualified by temporal, social, and topical criteria. In one embodiment, temporal, social, and topical criteria are used to weight the personalized distance calculation for each of the routes. Thus, for example, a temporal criteria that specifies the shortest travel time causes the personalized distance calculation to heavily weight projected travel time and minimize or ignore other factors. A temporal criterion that states a specific time or range of times causes the personalized distance calculation to negatively affect personalized distance only when projected travel time falls outside the targeted time or range of times.

A social criteria that specifies, for example, a wish to be with friends causes the personalized distance calculation to heavily weight the presence of the user's friends along a route or at the destination. A social criteria that specifies, for example, a desire to avoid a specific person causes the personalized distance calculation to negatively weight the presence of such a person along a route or at the destination. A topical criteria that specifies an interest in a musical performance at the ending location may negatively weight a route that arrives at the location after musical performances have ended can be negatively weighted.

An objective based routing request can be comprised of criteria that do not explicitly specify beginning and ending locations. Referring back to FIG. 7, for example, user 702 may enter a routing request to have dinner with friend 726, and then, the same night, to go to a jazz club with good food reviews where, ideally one or more of user 702's friends, such as users 706, 710, and 726 will be present. Such a request does not specify a physical route, nor any specific destination. Such a request must then be initially resolved to physical locations which may, additionally, have temporal constraints.

Thus, rather than initially determining an actual route, spatial, temporal, social, and topical data are retrieved within the domain defined by the objectives. Referring to FIG. 9, the data relevant to such a request can include: the requesting user RWE's 802 current location as determined via, for example, user proxy device 804; the requesting user's profile; the requesting user's friends 806, 810, and 826; the profiles and interaction data of friends 828 and 807 respectively; and IOs relating to topics 828 for jazz and restaurant reviews. In the context of FIG. 9, topical IO 828 for jazz may refer to multiple locations, only one is shown in FIG. 9.

The spatial, temporal, social, and topical data relating to the request can be correlated to determine spatial locations that can satisfy the objectives in the request. In one embodiment, every entity and logical object known to the W4 COMN that is potentially relevant to the request can be mapped and represented against all other known entities and data objects in order to create both a micro graph for every such entity, as well as a global graph that relates all such known entities with one another. In one embodiment, such relationships between entities and data objects are stored in a global index within the W4 COMN.

The result of such correlation can be a list of locations that can satisfy the objectives of the request, as well as spatial, temporal, social, and topical data relating to every such location. A personalized distance, can be determined for every such location, and one or more locations having the shortest or most desirable personalized distance to the user can be automatically (or manually) selected. For example, in the case of the routing request discussed above, when data relating to the request is retrieved, it may be determined based on profile or interaction data 838 that the user's friend 726 will be at home for the evening, thus the first physical location in the route will the friend's home 728. A physical route having the shortest personalized distance from the user's starting location 720 to the user's friend's house can then be determined.

It may be further determined that there are one or more locations featuring jazz music. The personalized distance to each location can be then be determined. In one embodiment, one or more physical routes can be selected for each location beginning at the user's friend's house 718 (the first stop on the requesting user's route), and ending at the location. The personalized distance to each location can then be determined factoring in route specific properties, such as travel time and overall desirability to the requesting user based on as well as any other spatial, temporal, social, or topical factors. The location having the shortest or most desirable personalized distance to the user can be automatically or manually selected. In one embodiment, more that one location is selected and is presented to the user as an alternative route.

At the time an objective-based routing request is processed, real-time sensor data as well as historical and interaction data are taken into account. An objective-based routing request can additionally be defined as dynamic, and can be periodically, or continuously updated and reevaluated using real-time sensor and interaction data. For example, if a route has been mapped for user 702 proceeding on physical route 730, first to user 726's house 728, and from there to location 724, conditions may change to alter the desirability of the route. A traffic accident on route 730 may require rerouting to a different physical route, or the arrival of another undesired person at the friend's house 728 may change the personal distance associated with that part of the user's route and thus cause some change in display/routing and/or notification of the change. Alternate routes may be dynamically evaluated by, for example, recalculating the personalized distance of each alternate route, and the most desirable route chosen.

Interaction data or GPS data may indicate that the user's friend 710 has cancelled plans to go to location 724 or is stuck in traffic, rendering the location 724 less desirable. Alternate locations can then be evaluated to determine if there are any locations featuring jazz that have are more desirable (i.e. have a more favorable personalized distance.) If user 702 leaves the location 720 too late, the user's friend 726 may be in bed, and thus, the spatial location 728 may be entirely dropped from the route.

In one embodiment, routing information is presented to the requesting user as a map overlay. Alternate routes can be presented with an indication of the personalized distance of each route. The map can scroll as the user's physical position changes. If a routing request is updated in real-time using real-time sensor and interaction data, the map overlay can be updated in real-time, and can additionally flash or provide visual alerts for changed conditions or rerouting.

In one embodiment, an objective-based routing request is periodically reprocessed as user proceeds along a route. The routing request can be reprocessed based on a trigger condition. A trigger condition can be based on any spatial, temporal, social, or topical criteria. For example, the request can be reprocessed if a real-time event indicates travel time may be impacted, for example, a change in traffic speed along the route, or the proximity of the user to a location, object, event or person encountered along the route or at one of the destinations.

The request can also be reprocessed if an event occurs that requires the selection of an alternative destination, for example, if a destination restaurant closes, or if a friend cancels a lunch appointment. The request can also be reprocessed if the user makes an unplanned stop. The request can also be reprocessed if the user alters the criteria of the routing request. Alternatively, the objective-based routing request may simply be reprocessed at a set interval, e.g. every 60 seconds to insure the route display remains fresh.

Figure 13:
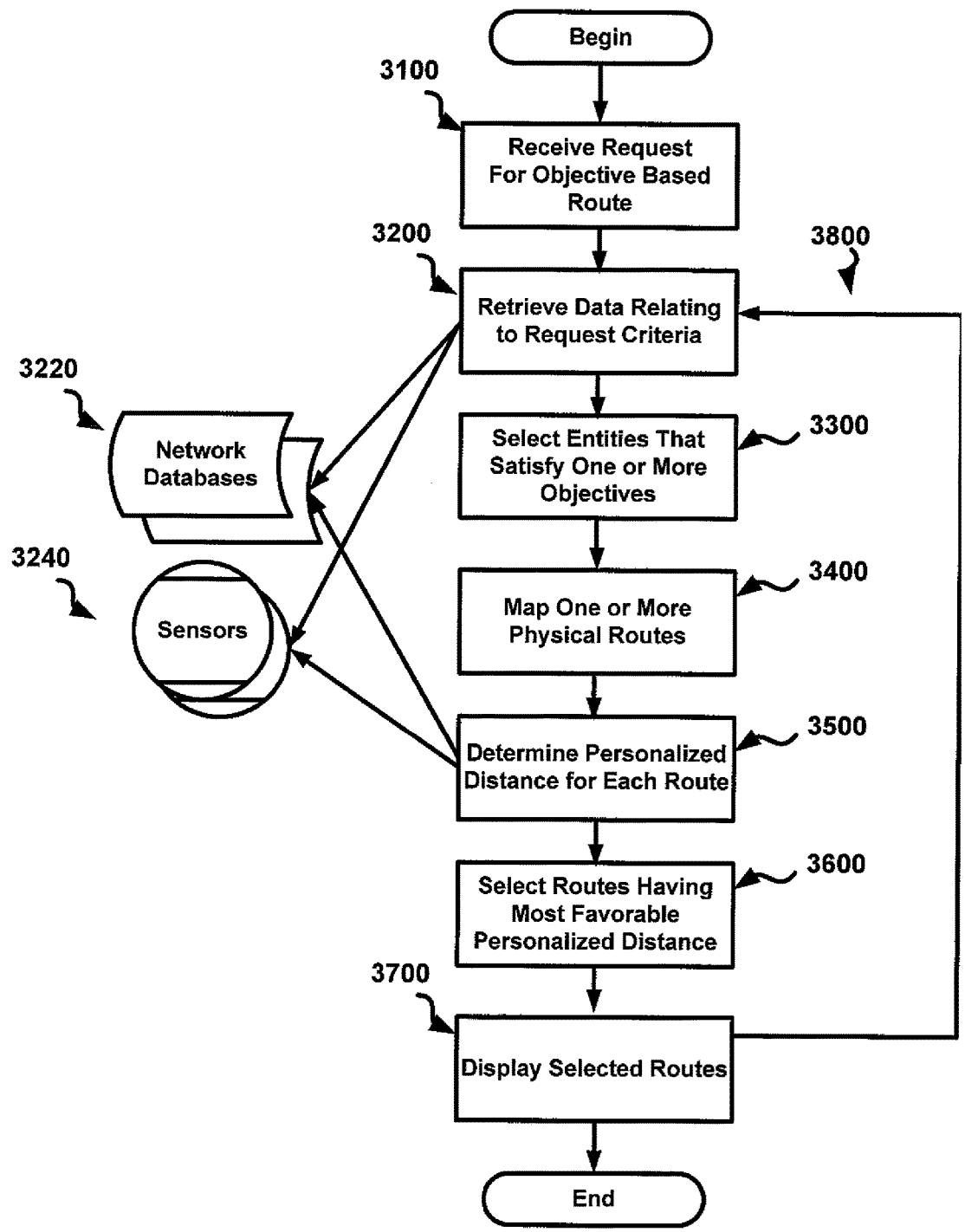
FIG. 13 illustrates one embodiment of a process 3000 of how a network having temporal, spatial, and social data, for example, a W4 COMN, can be used for the determination of an objective based route.

FIG. 13 illustrates one embodiment of a process 3000 of how a network having temporal, spatial, and social data, for example, a W4 COMN, can be used for the determination of an objective based route.

A request is received for mapping an objective-based route 3100, where the request can include spatial, temporal, social, and topical criteria and where such criteria may be objectives or constraints. Spatial, temporal, social, and topical data related to request criteria are retrieved 3200 from network databases 3220 and network sensors 3240. At least one entity that satisfies at least one objective within the request criteria, and which has a known physical location, are selected 3300 using the data retrieved from the network databases 3220 and sensors 3240. At least one physical route is mapped 3400 between a starting location, such as, for example, the requesting user's current location or a starting location specified in the request, and each selected entity.

A personalized distance is determined 3500 for every route mapped in step 3400 using the methods discussed above. The personalized distance can be determined using only the data that was initially retrieved relating to the request criteria in step 3200. Alternatively, the personalized distance determination may additionally retrieve additional spatial, temporal, social, and topical criteria which relates to one or more of the routes identified in step 3400. The entities and routes having the most favorable personalized distances are selected 3600 and used to construct and display one or more suggested routes 3700 that best meet the criteria of the objective-based route. If a route request is a dynamic or real-time route request, steps 3200 through 3700 can be repeated until the request expires periodically or based on a trigger condition.

Figure 14:
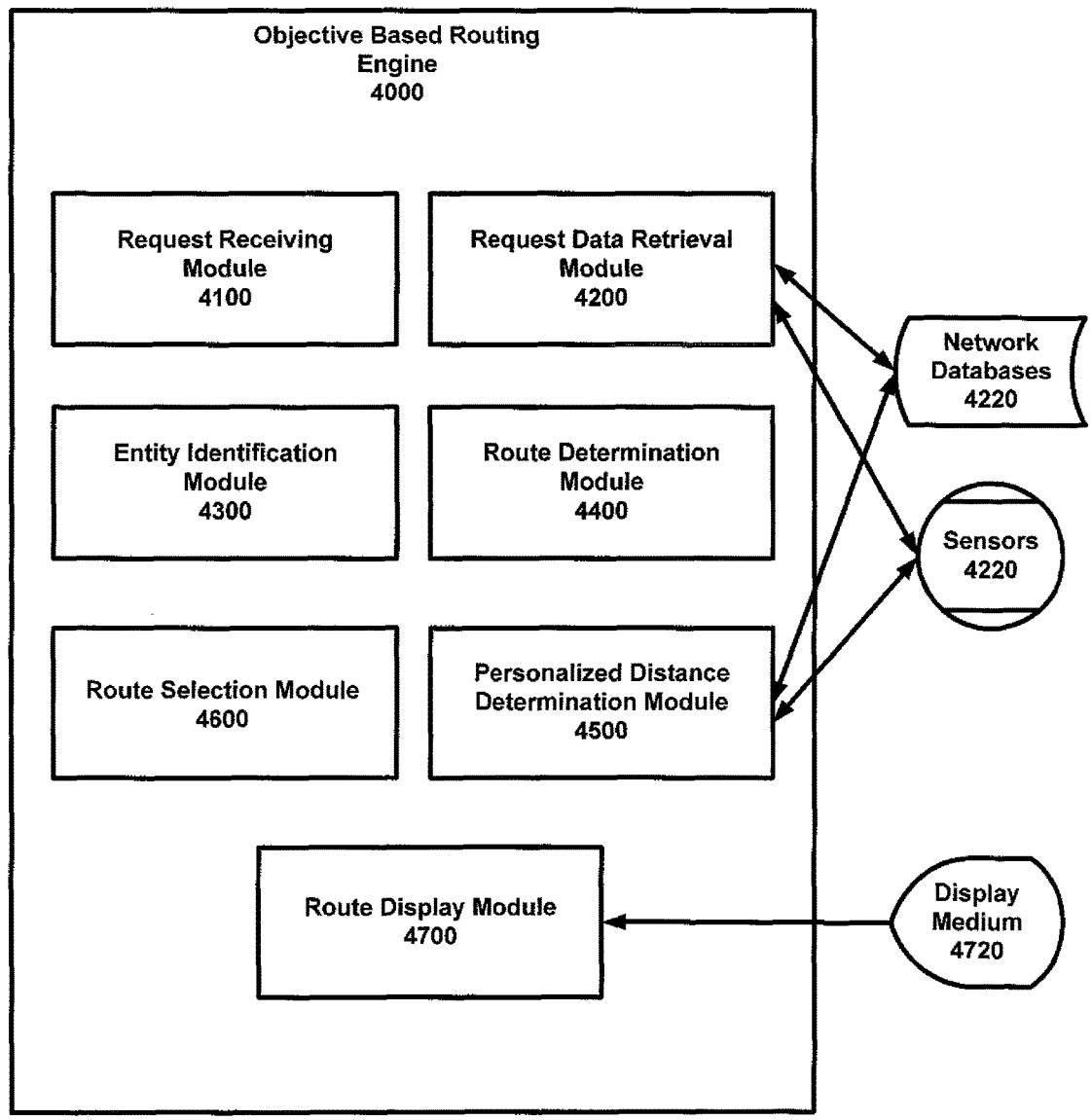
FIG. 14 illustrates one embodiment of a objective-based routing engine 4000 that is capable of supporting the process in FIG. 13.

FIG. 14 illustrates one embodiment of a objective-based routing engine 4000 that is capable of supporting the process in FIG. 13. In one embodiment, the objective-based routing engine 4000 is a component of a W4 engine 502 within a W4 COMN and may use modules within the W4 engine to support its functions.

A request receiving module 4100 receives requests for mapping an objective-based route, where the request can include spatial, temporal, social, and topical objectives. A request data retrieval module 4200 retrieves spatial, temporal, social, and topical data from network databases 4220 and sensors 4240 for entities and objects associated with request objectives. An entity identification module 4300 identifies entities that satisfy objectives within the request and which have a known physical location using the data retrieved from the network databases 4220 by the request data retrieval module 4200.

A route determination module 4400 maps one or more physical routes between a starting location and entities selected. Starting locations may be, without limitation, a requesting user's location, or a starting location identified in an objective-based route request. A personalized distance determination module 4500 determines a personalized distance for every route mapped by the route determination module 4400. The personalized distance can be determined using only the data that was retrieved relating to the request criteria. Alternatively, the personalized distance determination may additionally retrieve additional spatial, temporal, social, and topical criteria which relates to one or more of the routes identified by the route determination module 4400. A route selection module 4600 selects the entities and routes having the most favorable personalized distances. A route display module 4700 constructs and displays one or more suggested routes using the selected routes and entities that best meet the criteria of the objective-based route on a display medium 4720, for example, a user interface of a user proxy device.

In one embodiment, the request receiving module provides an interface for entry of objective-based mapping requests. The interface may be a graphical user interface displayable on computers, mobile phones or gaming devices or PDAs, including HTTP documents accessible over the Internet. Such an interfaces may also take other forms, including text files, such as SMS, emails, and APIs usable by software applications located on computing devices. In one embodiment, a personalized distance request can be entered on a mapping application interface, such as Yahoo Maps. The request may be for the current time, or may be for a future point in time.

In one embodiment, the request data retrieval module 4200 can be component of a correlation engine 506, and makes use of data relationships within the W4 COMN to retrieve data related to the criteria of an objective-based mapping request. For example, referring back to FIG. 9, a requesting user 802 may have a social network that relates to user/friend RWEs 806, 810, and 820, who can have profiles 828, interaction data 807, and physical locations 824 which are known by the network through, for example, a user proxy device. Thus, an objective-based mapping request that references a specific friend or a user's entire social network can access detailed information about the physical location, preferences, and interactions of persons within the requesting user's social network using relationships within a W4 COMN. Implicit relationships may also be derived through W4 sensed data related to a user including frequency, duration/length, tone and other attributes among users that demonstrate social relations.

The W4 COMN can additionally include information about locations 824 that can include the location's physical position, the nature of the business conducted at the location RWE 824, and the business's name and other demographic information. Locations, such as RWE 824 can be further associated with IOs relating to topics 828 which can that indicate, for example, that the business hosts live music of a particular genera, or which can contain ratings or reviews of the location. Thus, an objective-based mapping request that references a specific location can retrieve geographical and demographic information, as well as ratings and reviews for the location using relationships within a W4 COMN. An objective-based mapping request that references a topic, such as a genera of music, can retrieve data relating to all locations which host the performance of a particular genera of music, and personalize the rank of those locations according to the relative W4 data associated with each.

The W4 COMN can additionally include information about events 842 occurring at a specific location 840 that can include the titles, dates and attendees of such events, as well as metadata about the event, such as the genera of the event, ranking of event, relevance to other topics, users or objects. Thus, an objective-based mapping request that references an event can retrieve biographical, geographical and scheduling information about the event using information sources and relationships within a W4 COMN. An objective-based mapping request that involves locations near location 840 can retrieve data relating to events occurring at the location 840 during the time frame of the request.

The W4 COMN can additionally include real-time sensors 824 that provide real-time data that can include traffic data on specific roads, as well as environmental conditions existing at specific spatial points. Objective-based mapping requests can explicitly specify a physical area, for example, a city or a geographical radius from a specific point. Alternatively, to the extent a mapping request retrieves one or more entities having a spatial locations, the physical area surrounding such spatial locations are implied by the request. Thus, an objective-based mapping request can retrieve real-time sensor data for geographical areas related to the request. Such sensor data retrieval can be performed before physical routes are mapped, or, alternatively, may be performed after one or more routes, for example, IO 830, are selected and may be updated as discussed above.

In one embodiment, the route display module 4700 displays routes on a user interface. The interface can be a graphical user interface displayable on mobile phones or gaming devices, computers or PDAs, including HTTP documents accessible over the Internet. Such an interface may also take other forms, including text files, such as SMS, emails, and APIs usable by software applications located on computing devices. In one embodiment, routes identified for an objective-based route can be displayed as an overlay of a graphical display of a map.

In one embodiment, the personalized distance of each displayed route can be displayed as an overlay of a graphical display of a map of the route to which the personalized distance relates. For example, the personalized distance could be displayed as a colored highlight over the length of the route wherein the color indicates the magnitude of the distance. For example, red could signify a distance of 20 miles or greater, or, alternatively, a route wherein the personalized distance is greater than twice the spatial distance. The personalized distance could also be displayed as a text tag on the route. Entities and objects which were used in the personalized distance calculation and which have a physical location close to the route can additionally be displayed as text tags or symbols on the map. In an alternative embodiment, the color coding of routes based on rank of users' likely preferences (e.g. the best route is colored green, the worst, brown), while another alternative embodiment uses size to differentiate the suggested route as the largest and others of further personal distance in decreasing size.

Content Enhanced Maps and Routing

A routing and mapping application that has access to spatial, temporal, social and topical data for users of the routing application can provide opportunities to provide enhanced content to users relating to entities on or near a route or on a map displayed on an end user device. In one embodiment, enhanced content takes the form of information on businesses known to the network related to a displayed map or route. Such information can include advertisements which can include sponsored content.

In one embodiment, the businesses displayed are selectively chosen based on spatial, temporal, social and topical data associated with an end user, which can include, without limitation, user profile data, user interaction data, and social network data. User data can be matched to profiles of businesses or advertisements such that only businesses of potential interest and ads targeted to the user are displayed. In one embodiment, such enhanced content can be displayed as an overlay on a map of a route or an area selected by a user.

Figure 15:
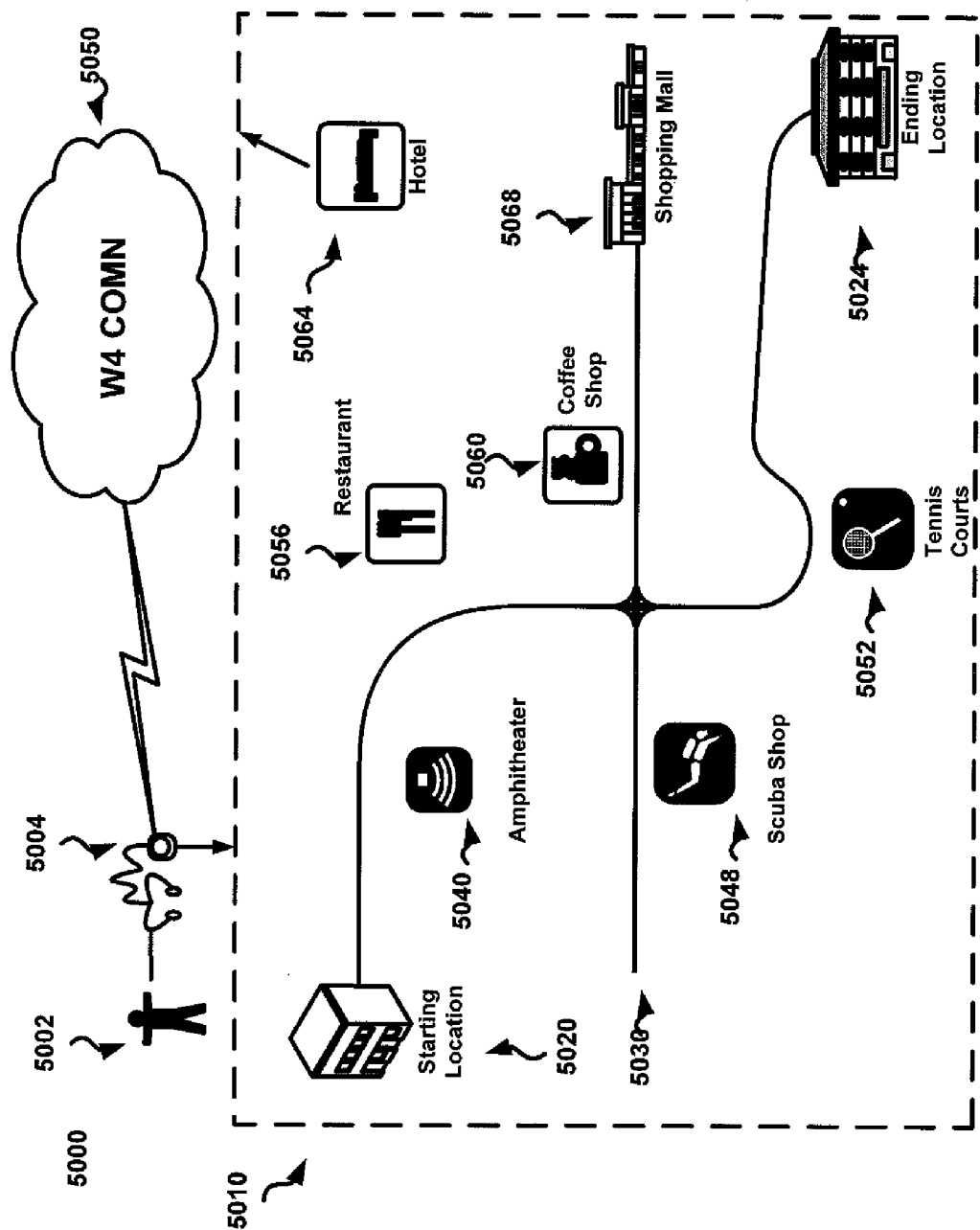
FIG. 15 illustrates one embodiment of a map display with enhanced content.

FIG. 15 illustrates one embodiment of a map display with enhanced content. A user 5002 has a portable device 5004 which is capable of displaying a route or map. The user device is connected to a network having spatial, temporal, social and topical data for users and businesses, for example, a W4 COMN 5050. In the illustrated example, the user 5002 has requested a route between a starting location 5020 and an ending location 5024. The user device 5004 displays a graphic map 5010 which displays a route 5030 between the starting location 5020 and the ending location 5024, and which further displays areas surrounding the route.

The map 5010 displays symbols for several businesses located along the route 5030: an amphitheater 5040; a scuba shop 5048; and a tennis court 5052. In the embodiment shown, these businesses may have been selected because of spatial and temporal proximity to the route 5030, and further because they relate to subject matter of interest to user 5002 (i.e. suggested content), who both plays tennis and scuba dives. In one embodiment, all businesses known to the network who are physically located on the route 5030 and which relate to subject matter of interest to the user 5002 are displayed. In another embodiment, only businesses which have paid to have their businesses listed on content enhanced maps are displayed. In another embodiment, businesses bid against each other for the right to serve their advertisements or sponsored content to this user and map/route combination.

The map 5010 further displays symbols for several businesses which are not located along the route 5030, but which are within, or near the bounds of the displayed geographical area: a restaurant 5056; a coffee shop 5060; a hotel 5064; and shopping mall 5068. The hotel 5064 is not located on the displayed map, but a pointer displays the direction where the hotel is located. The restaurant 5056 may have been selected because of spatial, temporal, social, or topical factors for example, because it is on the map and because it is a favorite restaurant of one or more of the user's 5002 friends. The shopping mall 5068 may have been selected because of the real-time presence of a friend at the mall.

The a coffee shop 5060; a hotel 5064; and shopping mall 5068 may have been selected because each may have an advertisement (i.e. sponsored content) which targets users which fit targeted advertisement criteria. In one embodiment, a targeted advertisement criteria can contain any spatial, temporal, social or topical criteria that define a targeted customer. The targeted advertisement criteria can be matched to user data, including user spatial and temporal position, user profile data, user interaction data, user transaction and historical data and user social network data, explicit such as in a defined friend's network or implicit from actual associations, communications and congregations. Targeted advertisement criteria may be broad, for example, any user who displays a map which displays the street the business is on. Targeted advertisement criteria may be narrow, for example, users whose friends are customers of the business. Targeted advertisement criteria may specify a geographic radius that extends beyond the boundaries of the map. Targeted advertisement criteria may be a combination of multiple factors and conditioned on exact criteria as specified by the Advertiser or Network operator.

In one embodiment, targeted advertisement criteria can include detailed information on sales and incentive programs associated with the advertisement. For example, a marketing program may be offering coupons, a percentage discount, other commercial incentives or non-commercial incentives such as reputation scores or reward points. In one embodiment, a targeted advertisement criteria can additionally offer means to communicate with an advertiser. For example, the advertising profile may specify that when an advertiser symbol on a map is selected, a real-time chat window in communication with sales associates opens up or a call is initiated to reservations, etc.

In one embodiment, if a route has been generated in response to an objective-based routing request, any spatial, temporal, social or topical criteria within the request itself can also be used to select businesses or targeted advertisements. For example, a route containing a dinner reservation, a movie, then coffee, may suggest a date, and the system could suggest "Send Them Flowers to Let Them Know You Had a Good Time" targeted advertisement, while a route containing a bakery, a florist and a dress shop could include targeted advertisements for local wedding planners or ceremony venues.

In one embodiment, user profile or preferences data can be used to control the display of suggested and sponsored content. A user can choose to suppress all content and simply display a map and a route. Alternatively, a user can condition display of suggested and sponsored content using any spatial, temporal, social, or topical criteria. For example, a user may limit display of sponsored content for places along a route that are offering a 10% or more incentive, sponsored content for places offering points for a specific reward program, or sponsored content for places rated well by the users friends. In one embodiment, users pay a periodic subscription fee for an ad free or an "ad control" version of their maps.

Figure 16:
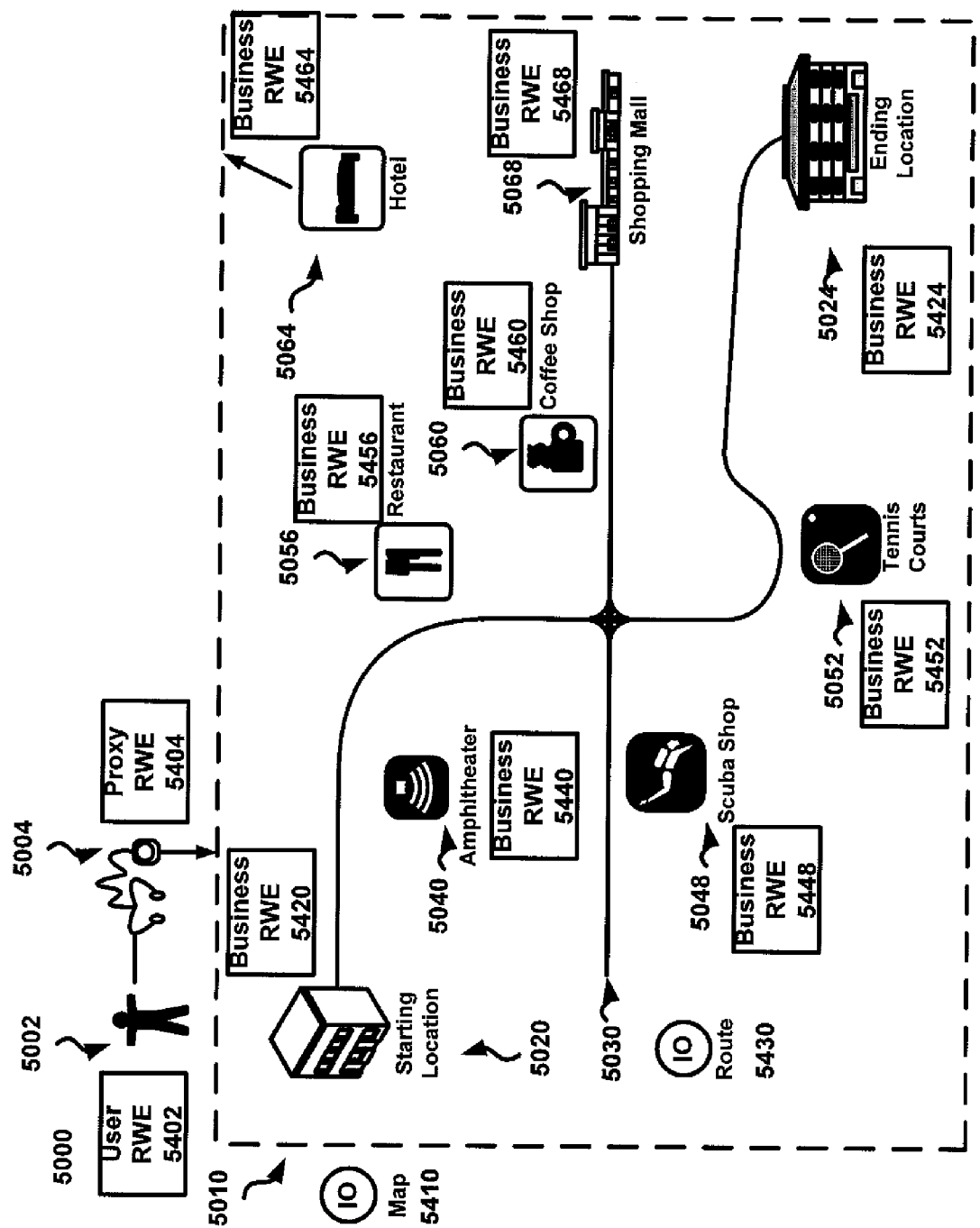
FIG. 16 illustrates one embodiment of how the objects shown in FIG. 15 can be defined to a W4 COMN.

FIG. 16 illustrates one embodiment of how the objects shown in FIG. 15 can be defined to a W4 COMN. User 5002 is represented as user RWE 5402, and Businesses 5020, 5024, 5040, 5048, 5052, 5056, 5060, 5064, and 5068 are represented as business or location RWEs 5420, 5424, 5440, 5448, 5452, 5456, 5460, 5464, and 5468 respectively.

Figure 17:
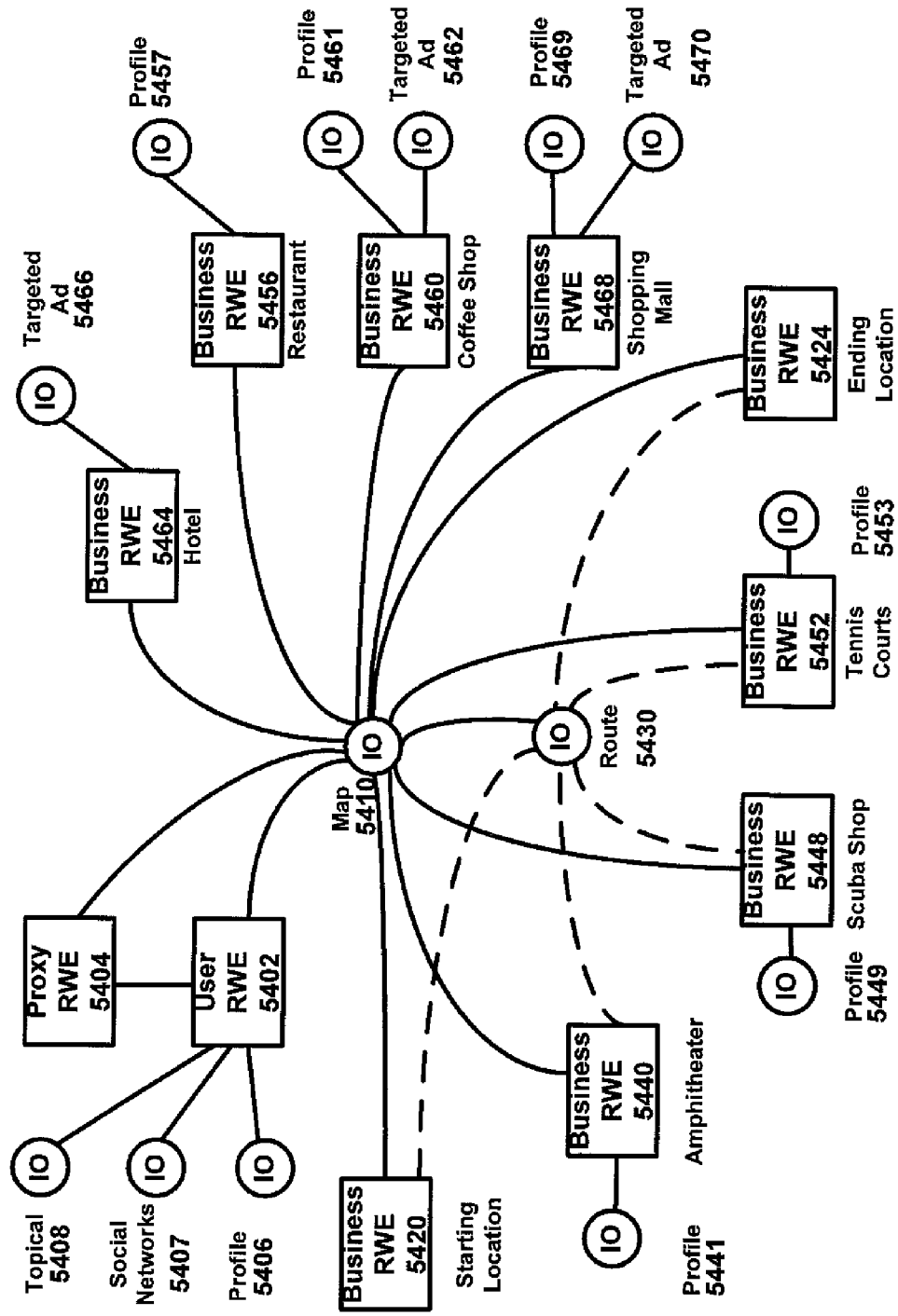
FIG. 17 illustrates one embodiment of a data model showing how the RWEs shown in FIG. 16 can be related to entities and objects within a W4 COMN which can be used to provide content enhanced mapping.

FIG. 17 illustrates one embodiment of a data model showing how the RWEs shown in FIG. 16 can be related to entities and objects within a W4 COMN which can be used to provide content enhanced mapping.

In the embodiment illustrated in FIG. 17, the user RWE 5402 is directly associated with an IO relating to user profile and preferences data 5406, an IOs relating to a social network 5407, and a topical IO which can relate to the user's interests and activities. The user RWE 5402 can also be indirectly related to an unbounded set of IOs related to spatial, temporal, and topical factors related to the requesting user through intermediate IOs. For example, the requesting user 5402 can be indirectly related to topical IOs which represent the interests or interaction data of persons associated with the user's social network 5407.

The RWE for the requesting user 5402 and the users proxy is directly associated with a map IO 5410. The map IO 5410 includes, in one embodiment, sufficient data to fully define the content of the map displayed on the user's proxy device. The IO can include the geographical bounds of the map, an image of the map, symbols representing businesses and other entities, and one or more routes that are displayed on the map. The map IO is associated with a route IO 5430 of a route displayed on the map. The route IO 5430 includes, in one embodiment, sufficient data to fully define the physical route, such as road segments and distances or a set of GPS coordinates.

The map IO is directly associated with a set of RWEs displayed on the map. The RWEs include an RWE for the starting location 5420 of the route 5430, an RWE for the ending location 5424 of the route 5430, and a set of business RWEs 5440, 5448, 5452, 5456, 5460, and 5468. The business RWEs 5440, 5448, 5452, 5456, 5460, and 5468 are each associated with an IO 5441, 5449, 5453, 5457, 5461, and 5469 respectively that contain a profile of each business, which can include the type of business, products offered, hours of operation, current incentives and so forth. Businesses 5460, 5464 and 5468 are each further associated with advertisements 5462, 5466 and 5470 respectively.

Figure 18:
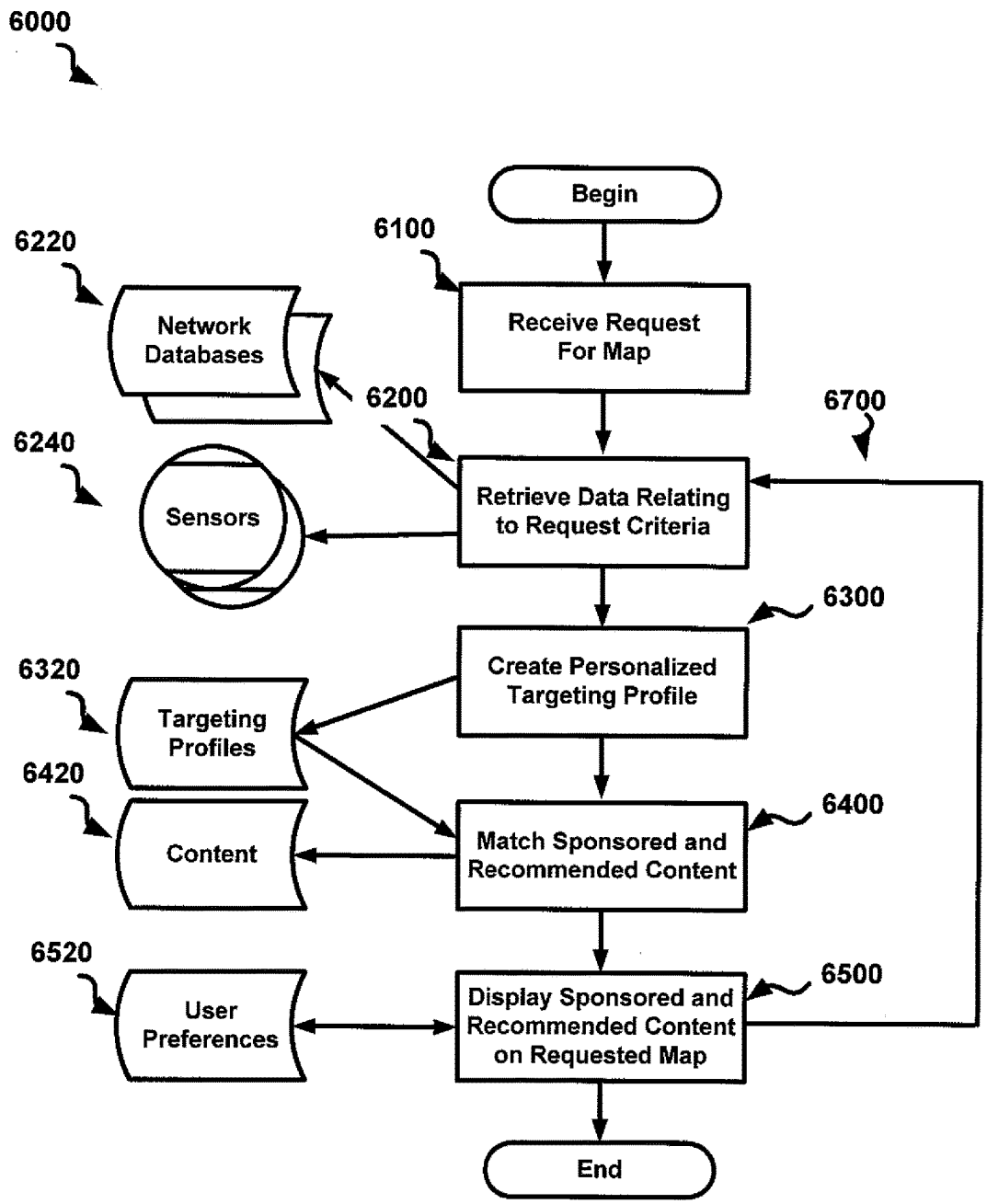
FIG. 18 illustrates one embodiment of a process of how a network having temporal, spatial, and social data, for example, a W4 COMN, can be used for the content enhanced routing and mapping.

FIG. 18 illustrates one embodiment of a process 6000 of how a network having temporal, spatial, and social data, for example, a W4 COMN, can be used for the content enhanced routing and mapping. Note that the processes and methods illustrated in FIG. 18 can be integrated with objective-based routing and mapping as shown in FIG. 13, but are not limited to such an embodiment.

A request is received for a map 6100 from a user. In one embodiment, the request is a request for mapping an objective-based route 6100, where the request can include spatial, temporal, social, and topical criteria, where such criteria may be objectives or constraints. Alternatively, the request can be a conventional request for a point to point route or for a map displaying a bounded physical area that contains only spatial criteria. Spatial, temporal, social, and topical data related to request criteria and the requesting user are retrieved 6200 from network databases 6220 and network sensors 6240. In one embodiment, the network databases 6220 include a global index of RWE and IO relationships maintained by the W4 COMN.

The spatial, temporal, social, and topical data related to request criteria and the requesting user are used to create 6300 a personalized targeting profile 6320 for every instance of a map request. The personalized targeting profile 6320 is then used to match sponsored and recommended content 6400 which relate to the targeting profile criteria. Sponsored content refers to any content an advertiser pays to have displayed to end users, such as, for example a map icon ad copy, a map overlay or translucent ad copy, a banner advertisement, a text link advertisement, a display ad copy advertisement, a mouseover ad copy or any other form of advertisement. Recommended content refers to information about businesses which may be interest to an end user, such as, for example, business profile information, ratings, reviews, and so forth. Finally, sponsored and recommended content is displayed 6500 on a user interface 6520 which displays the requested map. If a route request is a dynamic or real-time route request, steps 6200 through 6600 can be repeated until the request expires.

Note that, in one embodiment, steps 6100 and 6200 can correspond to the steps 3100 and 3200 of process 3000 in FIG. 13 and processes 3000 and 6000 may be executed substantially in parallel. Furthermore, sponsored and recommended content displayed by step 6500 of process 600 may be displayed on the map displayed by step 3700 of process 3000.

Figure 19:
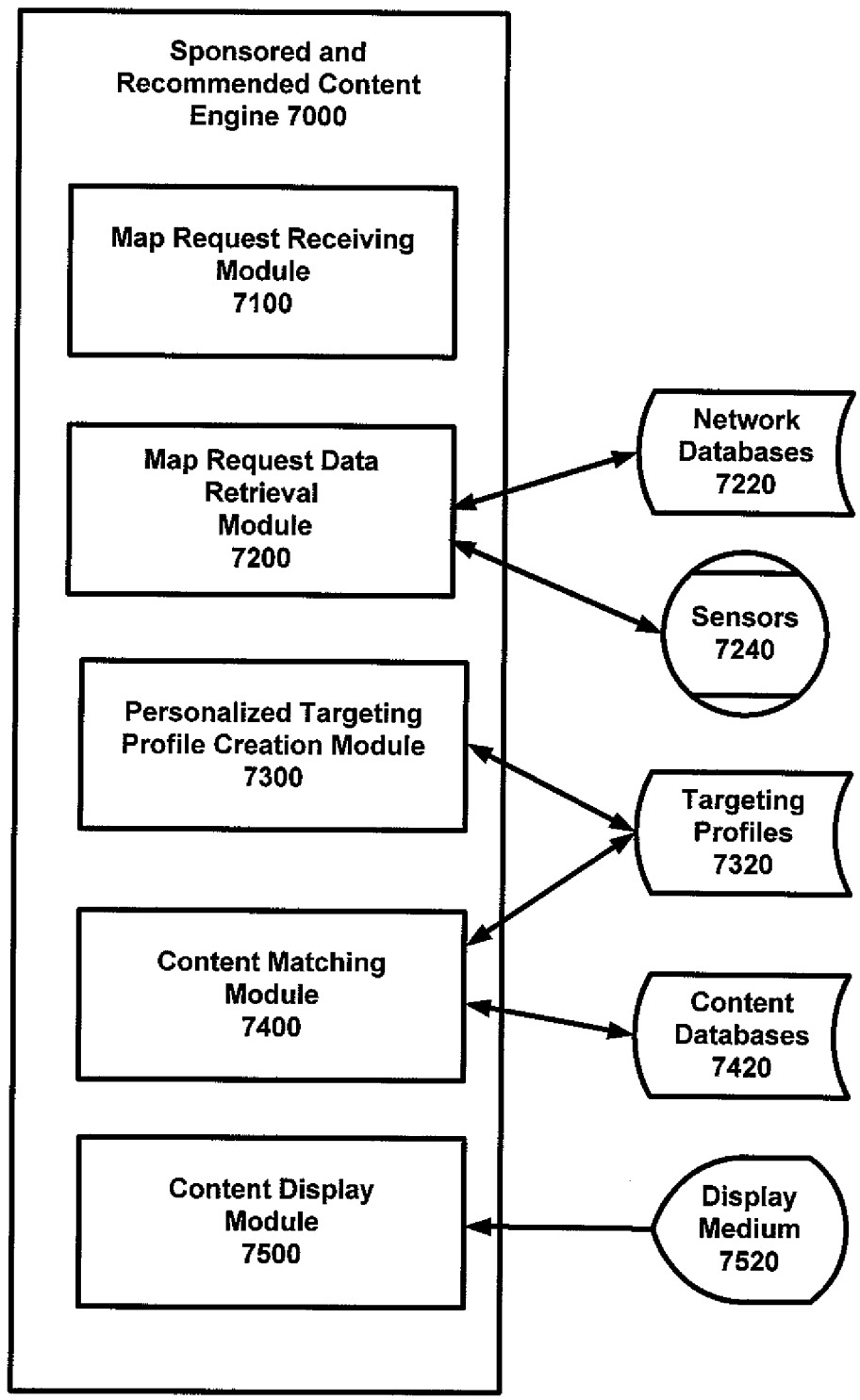
FIG. 19 illustrates one embodiment of a sponsored and recommended content engine that is capable of supporting the process in FIG. 18.

FIG. 19 illustrates one embodiment of a sponsored and recommended content engine 7000 that is capable of supporting the process in FIG. 18. In one embodiment, a sponsored and recommended content engine 7000 is a component of a W4 engine 502 within a W4 COMN and may use modules within the W4 engine to support its functions.

A map request receiving module 7100 receives requests for a map from an end user. A map request data retrieval module 7200 retrieves spatial, temporal, social, and topical data from network databases 7220 and sensors 7240 related to request criteria and the requesting user. A personalized targeting profile 7300 creation module uses spatial, temporal, social, and topical data related to request criteria and the requesting user to create a personalized targeting profile 7320 for the map request. A content matching module 7400 uses personalized targeting profiles 7320 to match sponsored and recommended content 7420 which relate to the targeting profile criteria. A content display module 7500 displays sponsored content on a display medium 7520.

In one embodiment, the request receiving module 7100 provides an interface for entry of mapping requests. The interface may be a graphical user interface displayable on mobile phones or gaming devices, computers or PDAs, including HTTP documents accessible over the Internet. Such an interfaces may also take other forms, including text files, such as SMS, emails, and APIs usable by software applications located on computing devices. In one embodiment, a personalized distance request can be entered on a mapping application interface, such as Yahoo Maps.

In one embodiment, the request receiving module 7100 provides for entry of a request for an objective-based route, where the request can include spatial, temporal, social, and topical criteria, and where such criteria may be objectives or constraints. Alternatively, the request can be a conventional request for a point to point route or for a map displaying a bounded physical area that contains only spatial criteria.

In one embodiment, the personalized targeting profile 7300 creation module creates targeting profiles 7320 that include spatial, temporal, social, and topical criteria that define attributes of the requesting user and the map request, and which indicate the type of businesses and advertisements the requesting user is interested in and which relate to the current map request. For example, the targeting profile 7320 can contain, without limitation, geographic boundaries that delimit a physical area, the requesting user's interests based on data about the starting point, route and destination(s), user profile data or user interaction data, the requesting user's recent purchasing behavior, and savings or incentives programs the user participates in.

In one embodiment, sponsored and recommended content reside on one more databases 7420 reserved for such content. Alternatively, sponsored and recommended content may be distributed throughout network databases 7220. In one embodiment, sponsored content includes advertisements which an advertiser wishes to direct to users whose targeting profile contains one or more spatial, temporal, social, and topical criteria. For example, in the case of spatial criteria, an advertiser may wish to target users who live in a particular zip code or any users requesting a route within a three mile radius of a specific location, or users of specific demographic or purchasing pattern history.

In the case of temporal criteria, an advertiser may wish to target users requesting a route on a specific day, or who are projected to be on the road at a specific time, or who are projected to be late for an objective. In the case of social criteria, an advertiser may wish to target a member of a specific social networking group, or an advertiser may target users whose friends are among the advertiser's customers or critics. In the case of topical criteria, an advertiser may wish to target users having a specific interest, such as an interest in a specific genera of music.

Referring back to the map displayed in FIG. 15, for example, the hotel 5064, the coffee shop 5060 and the shopping mall 5068 are displayed on the user's proxy device 5004 because each is associated with a targeted advertisement (5466, 5462, and 5070 of FIG. 17) which is, in some way, relevant to the end user or the end user's map request. For example, the hotel 5064 is located off of the displayed map, but the advertisement, 5466 of FIG. 17, may have targeted users who are from out-of-town, who travel frequently, are in a specific line of business and are driving in a specific zip code. The coffee shop advertisement, 5462 of FIG. 17, may have targeted requesting users who traveling on route 5030 between 7:00 AM and 9:00 AM on weekdays. The shopping mall advertisement, 5070 may have targeted users whose friends patronize shops within the mall.

In one embodiment recommended content includes basic business profile information, such as products offered, hours of operation, and so forth, for businesses which have attributes which indicate the businesses may be of interest to the requesting end user in the context of the current mapping request or the current known contexts of the user's life. In one embodiment, such recommended content can include data for all businesses whose location is on a displayed map and a user can mouseover or select each business as indicated on the map for more information or sponsored content. Spatial, temporal, social, and topical data can be used to select recommended content.

For example, in the case of spatial criteria, businesses may be selected that are within three blocks of the user's projected route. In the case of temporal criteria, only businesses that are open for business within a specific time range may be selected. In the case of social criteria, only businesses which are frequented by the friends of the requesting user are selected. In the case of topical criteria, only businesses relating to the requesting user's hobbies or interests are selected.

Referring back to the map displayed in FIG. 15, for example, the amphitheater 5040, scuba shop 5048, tennis Court 5052 and restaurant 5056 are displayed on the user's proxy device 5004 because each is associated spatial, temporal, social or topical data associated with the map request and the requesting user. For example, each of the entities 5040, 5048, 5052 and 5056 are, spatially, on or near the requesting user's projected route 5030. The scuba shop 5048 and tennis Court 5052 may have been selected because the requesting user's profile, e.g. 5406 of FIG. 17, lists scuba and tennis as interests of the requesting user. The amphitheater 5040 may have been selected because a future event, e.g. 5441 of FIG. 17, indicates a favorite performer of the requesting user will be performing there. The restaurant 5056 may have been selected because persons within the requesting user's social network, e.g. 5407 of FIG. 17 have favorably reviewed the restaurant.

Referring back to FIG. 19, in one embodiment, the content display module displays content on a user interface. The interface can be a graphical user interface displayable on mobile phones or gaming devices, computers or PDAs, including HTTP documents accessible over the Internet. Such an interface may also take other forms, including text files, such as SMS, emails, and APIs usable by software applications located on computing devices. In one embodiment, content can be displayed as an overlay of a graphical display of a map to which the content relates.

Figure 20:
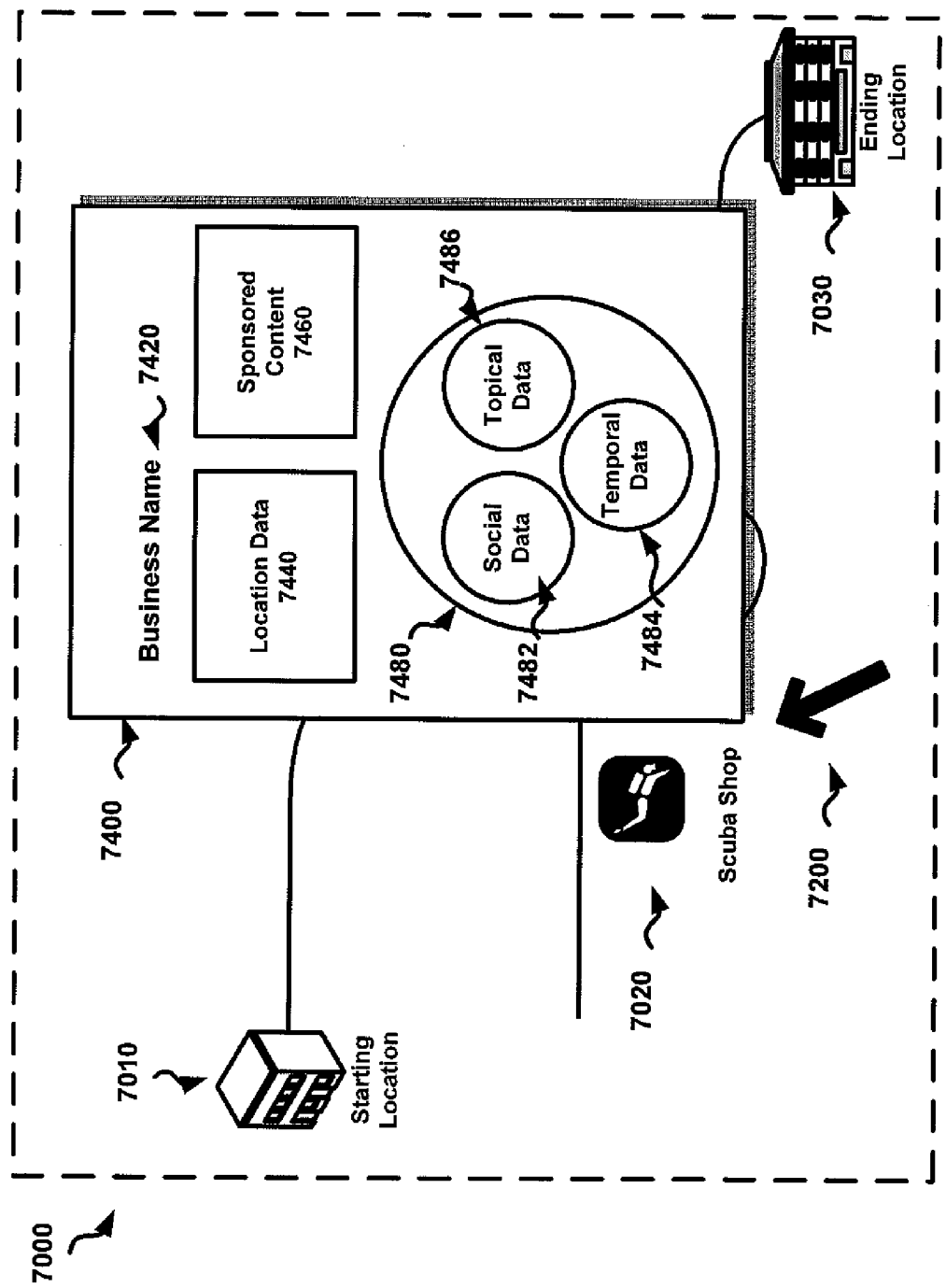
FIG. 20 illustrates one embodiment of a popup in interface element displayed when a user passes a mouse cursor over an symbol representing a business which is displayed on a content enhanced map.

For example, selected content can be displayed on a map in a manner similar to that shown in FIG. 15, where initially, a single symbol is displayed indicating a business entities for which there is sponsored or recommended content. In one such embodiment, further information can be displayed in a popup window regarding the selected content when a mouse cursor is moved over the symbol. FIG. 20 illustrates one possible embodiment of such an interface element. A map 7000 is displayed which shows symbols for starting location 7010, an ending location 7020, and a business, a scuba shop 7030. When a mouse cursor 7200 is moved near or over the symbol for the scuba shop 7030, a popup window 7400 is displayed.

The popup window contains the business name 7420 and data regarding the location 7440, such as address, telephone number, hours of operation, and products and services offered. If sponsored content, such as a targeted advertisement, is available for the location, it is displayed in a separate area 7460 on the popup window. The popup window can also display data 7480 which reveals temporal 7484, social 7482, and topical 7486 relationships between the content and the requesting user or the map request.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

We claim:

1. A method comprising the steps of:
   receiving, over a network, a request for the determination of a route, such that the request comprises an identification of a requesting user, and a plurality of objectives;
   retrieving spatial, temporal, topical, and social data available to the network relating to the requesting user and spatial, temporal, topical, and social data available to the network relating to the plurality of objectives by using a global index of data available to the network and a plurality of data sources using the global index of data available to the network,
   wherein the global index comprises a global graph that relates entities known to the network with one another,
   wherein at least a subset of the plurality of data sources comprises a plurality of sensors accessible to the network that continuously transmit real-time data, and
   wherein each sensor of the plurality of sensors is associated with a spatial reference point;
   selecting, via the network, a plurality of entities which satisfy at least some of the plurality of objectives, such that each entity of the plurality of entities is selected using the retrieved spatial, temporal, topical, and social data for the user and each of the objectives, and each respective entity has a physical location known to the network, said selection using the retrieved spatial, temporal, topical, and social data for the user and each of the objectives occurs prior to mapping the route;

mapping, based on said selection, a plurality of physical routes between a starting location and each entity of the plurality of entities;

determining, via the network, a respective personalized distance for each route of the plurality of physical routes using the spatial, temporal, topical, and social data available to the network relating to the requesting user and the plurality of objectives; and displaying, on a display medium, each route of the plurality of physical routes and a representation of the respective personalized distance relating to each route of the plurality of physical routes, said representation of the respective personalized distance comprising an indicator associated with a value of the respective personalized distance.

2. The method of claim 1 comprising the additional step of:

selecting, via the network, one of the plurality of physical routes that has a most favorable personalized distance, wherein only the selected route is displayed on the display medium.

3. The method of claim 1 wherein the receiving, retrieving, selecting, mapping, and displaying steps are repeated on occurrence of a trigger condition.

4. The method of claim 3 wherein the trigger condition is selected from the list: a time, a date, the passage of a fixed time interval, and a calendar event.

5. The method of claim 3 wherein the trigger condition is selected from the list: proximity of the requesting user to a location, proximity of the requesting user to an object, proximity of the requesting user to an event, and proximity of the requesting user to a person.

6. The method of claim 3 wherein the trigger condition is specified by the request for the determination of a route.

7. The method of claim 1 wherein at least one of the plurality of objectives is a social objective.

8. The method of claim 1 wherein at least one of the plurality of objectives is a topical objective.

9. The method of claim 1 wherein the starting location is the current location of the requesting user.

10. The method of claim 1 wherein the request for the determination of a route specifies the starting location.

11. A non-transitory computer-readable storage medium having computer-executable instructions for a method comprising the steps:

receiving, over a network, a request for the determination of a route, such that the request comprises an identification of a requesting user, and a plurality of objectives;

retrieving spatial, temporal, topical, and social data available to the network relating to the requesting user and spatial, temporal, topical, and social data available to the network relating to the plurality of objectives by using a global index of data available to the network and a plurality of data sources using the global index of data available to the network, wherein the global index comprises a global graph that relates entities known to the network with one another, wherein at least a subset of the plurality of data sources comprises a plurality of sensors accessible to the network that continuously transmit real-time data, and wherein each sensor of the plurality of sensors is associated with a spatial reference point;

selecting, via the network, a plurality of entities which satisfy at least some of the plurality of objectives, such that each entity of the plurality of entities is selected using the retrieved spatial, temporal, topical, and social data for the user and each of the objectives, and each respective entity has a physical location known to the network, said selection using the retrieved spatial, temporal, topical, and social data for the user and each of the objectives occurs prior to mapping the route;

mapping, based on said selection, a plurality of physical routes between a starting location and each entity of the plurality of entities;

determining, via the network, a respective personalized distance for each route of the plurality of physical routes using the spatial, temporal, topical, and social data available to the network relating to the requesting user and the plurality of objectives; and displaying, on a display medium, each route of the plurality of physical routes and a representation of the respective personalized distance relating to each route of the plurality of physical routes, said representation of the respective personalized distance comprising an indicator associated with a value of the respective personalized distance.

12. The non-transitory computer-readable storage medium of claim 11 comprising the additional step of:

selecting, via the network, one of the plurality of physical routes that has a most favorable personalized distance, wherein only the selected route is displayed on the display medium.

13. The non-transitory computer-readable storage medium of claim 11 wherein the receiving, retrieving, selecting, mapping, and displaying steps are repeated on occurrence of a trigger condition.

14. The non-transitory computer-readable storage medium of claim 13 wherein the trigger condition is selected from the list: a time, a date, the passage of a fixed time interval, and a calendar event.

15. The non-transitory computer-readable storage medium of claim 13 wherein the trigger condition is selected from the list: proximity of the requesting user to a location, proximity of the requesting user to an object, proximity of the requesting user to an event, and proximity of the requesting user to a person.

16. The non-transitory computer-readable storage medium of claim 13 wherein the trigger condition is specified by the request for the determination of a route.

17. The non-transitory computer-readable storage medium of claim 13 wherein at least one of the plurality of objectives is a social objective.

18. The non-transitory computer-readable storage medium of claim 11 wherein at least one of the plurality of objectives is a topical objective.

19. The non-transitory computer-readable storage medium of claim 11 wherein the starting location is the current location of the requesting user.

20. The non-transitory computer-readable storage medium of claim 11 wherein the request for the determination of a route specifies the starting location.

21. A system comprising:

a processor;

a non-transitory computer-readable storage medium for tangibly storing thereon program logic for execution by the processor, the program logic comprising:

logic executed by the processor for receiving, over a network, a request for the determination of a route, such that the request comprises an identification of a requesting user, and a plurality of objectives;

logic executed by the processor for retrieving spatial, temporal, topical, and social data available to the network relating to the requesting user and spatial, temporal, topical, and social data available to the network relating to the plurality of objectives by using a global index of data available to the network and a plurality of data sources using the global index of data available to the network, wherein the global index comprises a global graph that relates entities known to the network with one another, wherein at least a subset of the plurality of data sources comprises a plurality of sensors accessible to the network that continuously transmit real-time data, and wherein each sensor of the plurality of sensors is associated with a spatial reference point;

logic executed by the processor for selecting, via the network, a plurality of entities which satisfy at least some of the plurality of objectives, such that each entity of the plurality of entities is selected using the retrieved spatial, temporal, topical, and social data for the user and each of the objectives, and each respective entity has a physical location known to the network, said selection using the retrieved spatial, temporal, topical, and social data for the user and each of the objectives occurs prior to mapping the route;

logic executed by the processor for mapping, based on said selection, a plurality of physical routes between a starting location and each entity of the plurality of entities;

logic executed by the processor for determining, via the network, a respective personalized distance for each route of the plurality of physical routes using the spatial, temporal, topical, and social data available to the network relating to the requesting user and the plurality of objectives;

logic executed by the processor for displaying, on a display medium, each route of the plurality of physical routes and a representation of the respective personalized distance relating to each route of the plurality of physical routes, said representation of the respective personalized distance comprising an indicator associated with a value of the respective personalized distance.

22. The system of claim 21, wherein the program logic additionally comprises: logic executed by the processor for selecting, via the network, one of the plurality of physical routes that has a most favorable personalized distance, wherein only the selected route is displayed on the display medium.

23. The system of claim 21 wherein at least one of the plurality of objectives is a social objective.

24. The system of claim 21 wherein at least one of the plurality of objectives is a topical objective.

* * * * *